(12) United States Patent

Shirao

(10) Patent No.: US 8,649,945 B2
(45) Date of Patent: Feb. 11, 2014

(54) WHEEL LOADER AND WHEEL LOADER CONTROL METHOD

(75) Inventor: Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/700,405

(22) PCT Filed: May 15, 2012

(86) PCT No.: PCT/JP2012/062352
§ 371 (c)(1),
(2), (4) Date: Nov. 27, 2012

(87) PCT Pub. No.: WO2013/145342
PCT Pub. Date: Oct. 3, 2013

(65) Prior Publication Data
US 2013/0259619 A1    Oct. 3, 2013

(30) Foreign Application Priority Data

Mar. 30, 2012  (JP) .................................. 2012-078938

(51) Int. Cl.
*G06F 17/00* (2006.01)
*E02F 9/20* (2006.01)

(52) U.S. Cl.
USPC ................. 701/50; 701/82; 701/84; 180/307; 180/305; 303/151; 303/142

(58) Field of Classification Search
USPC ............ 701/50, 70, 82, 84, 83; 180/305, 306, 180/307, 53.2, 244; 172/1, 3, 105; 37/395, 37/394; 303/151, 139, 145, 142
See application file for complete search history.

(56) References Cited

U.S. PATENT DOCUMENTS

| 2008/0234902 A1* | 9/2008 | Johnson et al. ................. 701/50 |
| 2013/0073152 A1* | 3/2013 | Harada et al. .................. 701/50 |

FOREIGN PATENT DOCUMENTS

| JP | 7-229560 A | 8/1995 |
| JP | 2004-24172 A | 1/2004 |
| JP | 2008-144942 A | 6/2008 |
| JP | 2011-63945 A | 3/2011 |

* cited by examiner

*Primary Examiner* — Christine Behncke
(74) *Attorney, Agent, or Firm* — Global IP Counselors, LLP

(57) ABSTRACT

A traction force control section of a wheel loader reduces maximum traction force to below the maximum traction force with traction force control in an off state when the traction force control is in an on state. The traction force control section increases the maximum traction force when determination conditions are satisfied with the traction force control in the on state. The determination conditions include that the work situation is digging, that the operation amount of the acceleration operation member is the predetermined operation threshold or more, and that a boom angle is the predetermined angle threshold or more.

18 Claims, 14 Drawing Sheets

(a)

(b)

WHEEL LOADER AND WHEEL LOADER CONTROL METHOD

CROSS-REFERENCE TO RELATED APPLICATIONS

This application claims priority to Japanese Patent Application No. 2012-078938 filed on Mar. 30, 2012, the disclosure of which is hereby incorporated herein by reference in its entirety.

TECHNICAL FIELD

The present invention relates to a wheel loader and a wheel loader control method.

PRIOR ART

A so-called HST (Hydro Static Transmission) is mounted in a wheel loader. A HST type of wheel loader drives a hydraulic pump using an engine and drives a movement hydraulic motor using hydraulic fluid which is discharged from the hydraulic pump. Due to this, the wheel loader moves. In such a HST type of wheel loader, it is possible to control vehicle speed and traction force by controlling the rotation speed of the engine, the displacement of the hydraulic pump, the displacement of the movement hydraulic motor, and the like (refer to Japan Patent Laid-open Patent Publication JP-A-2008-144942).

In the wheel loader, it is possible for an operator to select execution of traction force control. In the traction force control, for example, the displacement of the movement hydraulic motor is limited to an upper limit displacement which is smaller than the maximum displacement. Due to this, the maximum traction force is reduced. The operator selects execution of traction force control when phenomena such as slipping or stalling are generated due to excessively large traction force. Due to this, the maximum traction force is reduced and the generation of phenomena such as slipping or stalling is suppressed.

SUMMARY

A certain type of wheel loader is configured so that it is possible for the level of the maximum traction force to be selected with traction force control by an operator. The operator selects the level of the maximum traction force in advance with the traction force control. When the operator operates a switch for execution of the traction force control, the maximum traction force is limited to the level which has been selected. Due to this, it is possible for the operator to select a level of the traction force which is appropriate according to, for example, the state of the road surface.

However, traction force which is necessary during digging work is not constant and the necessary traction force differs according to the circumstances of the work. As a result, it is not easy for the operator to select which level of maximum traction force will be most appropriate in advance in order for phenomena such as slipping or stalling to not be generated. Accordingly, in the wheel loader as described above, it is necessary that the level of the maximum traction force be selected by the operator for each change in the circumstances of the work during digging work.

For example, there is so-called lifting work in the work which is performed by the wheel loader. The lifting work is work where a target object such as pasture grass or the like is loaded into a bucket by digging and piled up while being moved forward. A large traction force is necessary when the wheel loader performs the lifting work. However, when traction force control is executed when the lifting work is performed, it is not possible for the work to be efficiently performed since the traction force is insufficient. In addition, in order to obtain sufficient traction force during the lifting work, it is necessary for the operator to perform an operation where the maximum traction force is changed to a higher level in the traction force control or an operation where the traction force control is terminated. Such operations are troublesome for the operator and are reasons why the operability of the wheel loader is reduced.

An object of the present invention is to provide a wheel loader and a wheel loader control method where it is possible to obtain sufficient traction force during lifting work and it is possible to suppress a reduction in operability.

A wheel loader according to a first aspect of the present invention includes a working implement, an engine, a hydraulic pump, a movement hydraulic motor, an acceleration operation member, a traction force control operation section, a work situation determination section, an acceleration operation amount determination section, a boom angle determination section, and a traction force control section. The working implement has a boom and a bucket. The hydraulic pump is driven by the engine. The movement hydraulic motor is driven by hydraulic fluid which is discharged from the hydraulic pump. The acceleration operation member is operated in order to set a target rotation speed for the engine. The traction force control operation section is operated in order to switch between an on state and an off state of the traction force control for reducing maximum traction force. The work situation determination section determines whether or not a work situation is digging. The acceleration operation amount determination section determines whether or not the operation amount of the acceleration operation member is a predetermined operation threshold or more. The boom angle determination section determines whether or not the boom angle is a predetermined angle threshold or more. The boom angle is an angle with regard to the horizontal direction of the boom. The traction force control section reduces the maximum traction force to below the maximum traction force with the traction force control in the off state when the traction force control is in the on state. The traction force control section increases the maximum traction force when determination conditions are satisfied with the traction force control in the on state. The determination conditions include that the work situation is digging, that the operation amount of the acceleration operation member is the predetermined operation threshold or more, and that the boom angle is the predetermined angle threshold or more.

A wheel loader according to a second aspect of the present invention is the wheel loader according to the first aspect wherein the traction force control section sets the control level of the traction force to a standard level in the traction force control. The maximum traction force at the standard level is smaller than the maximum traction force with the traction force control in the off state. The traction force control section changes the control level of the maximum traction force to a high level when the determination conditions are satisfied with the traction force control in the on state. The maximum traction force at the high level is higher than maximum traction force at the standard level.

A wheel loader according to a third aspect of the present invention is the wheel loader according to the second aspect wherein the maximum traction three at the high level is smaller than the maximum traction force with the traction force control in the off state.

A wheel loader according to a fourth aspect of the present invention is the wheel loader according to the second aspect wherein the traction force control section has a traction force level changing section for changing the size of the maximum traction force at the standard level and a traction force control operation member for instructing the execution of the traction force control at the standard level.

A wheel loader according to a fifth aspect of the present invention is the wheel loader according to the fourth aspect wherein the maximum traction force at the high level is constant irrespective of the size of the maximum traction force at the standard level which is changed by the traction force level changing section.

A wheel loader according to a sixth aspect of the present invention is the wheel loader according to the fifth aspect wherein the traction force is the maximum traction force when vehicle speed is a first vehicle speed which is higher than zero in a case where the traction force control is in the off state. The traction force at the high level when the vehicle speed is zero matches with the traction force with the traction force control in the off state when the vehicle speed is zero.

A wheel loader according to a seventh aspect of the present invention is the wheel loader according to the second aspect wherein the traction force control section returns the control level of the traction force to the standard level when the determination conditions are no longer satisfied with the traction force control in the on state.

A wheel loader according to an eighth aspect of the present invention is the wheel loader according to the first aspect wherein the traction force control operation section has a traction force control selection section for selecting the control level of the traction force from a plurality of levels and for instructing the execution of the traction force control. The traction force control section increases the maximum traction force more than the level selected by the traction force control selection section when the determination conditions are satisfied with the traction force control section in the on state.

A wheel loader according to a ninth aspect of the present invention is the wheel loader according to the eighth aspect wherein the traction force control section increases the maximum traction force to one level higher than the level selected by the traction force control selection section when the determination conditions are satisfied with the traction force control section in the on state.

A wheel loader according to a tenth aspect of the present invention is the wheel loader according to the eighth aspect wherein the traction force control section returns the control level of the traction force to the original level when the determination conditions are no longer satisfied with the traction force control section in the on state.

A wheel loader according to an eleventh aspect of the present invention is the wheel loader according to the first aspect wherein the traction force control section does not perform the increasing of the maximum traction force when the work situation is not digging.

A wheel loader according to a twelfth aspect of the present invention is the wheel loader according to the first aspect wherein the traction force control section does not perform the increasing of the maximum traction force when the operation amount of the acceleration operation member is not the predetermined operation threshold or more.

A wheel loader according to a thirteenth aspect of the present invention is the wheel loader according to the first aspect wherein the traction force control section does not perform the increasing of the maximum traction force when the boom angle is not the predetermined angle threshold or more.

A wheel loader according to a fourteenth aspect of the present invention is the wheel loader according to the first aspect wherein the work situation determination section determines whether or not the work situation is digging based on a movement state of the vehicle and an action state of the working implement.

A wheel loader according to a fifteenth aspect of the present invention is the wheel loader according to the first aspect wherein the traction force control section controls a displacement of the movement hydraulic motor by controlling an inclination angle of the movement hydraulic motor and performs control of the maximum traction force by controlling an upper limit displacement of the displacement of the movement hydraulic motor.

A wheel loader according to a sixteenth aspect of the present invention is any wheel loader according to the first to fifteenth aspects wherein the traction force control section sets a traction force ratio according to the operation amount of the acceleration operation member or the engine rotation speed with the traction force control in the on state with a ratio of the maximum traction force, with regard to the maximum traction force with the traction force control in the off state, is set as the traction force ratio.

A wheel loader according to a seventeenth aspect of the present invention is the wheel loader according to the sixteenth aspect wherein the traction force control section increases the traction force ratio by a predetermined proportion when the determination conditions are satisfied with the traction force control in the on state.

A control method according to an eighteenth aspect of the present invention is a wheel loader control method. The wheel loader includes a working implement, an engine, a hydraulic pump, a movement hydraulic motor, an acceleration operation member, and a traction force control operation section. The working implement has a boom and a bucket. The hydraulic pump is driven by the engine. The movement hydraulic motor is driven by hydraulic fluid which is discharged from the hydraulic pump. The acceleration operation member is operated in order to set a target rotation speed for the engine. The traction force control operation section is operated in order to switch between an on state and an off state of the traction force control for reducing maximum traction force. The control method according to the aspect includes the following steps. A first step is determining whether or not a work situation is digging. A second step is determining whether or not a boom angle is a predetermined angle threshold or more. A third step is determining whether or not the operation amount of the acceleration operation member is a predetermined operation threshold or more. The boom angle is an angle with regard to a horizontal direction of the boom. A fourth step is reducing the maximum traction force to below the maximum traction force with the traction force control in the off state when the traction force control is in the on state. A fifth step is increasing the maximum traction force when determination conditions are satisfied with the traction force control in the on state. The determination conditions include that the work situation is digging, that the operation amount of the acceleration operation member is the predetermined operation threshold or more, and that the boom angle is the predetermined angle threshold or more.

In the wheel loader according to the first aspect of the present invention, the maximum traction force is increased when the determination conditions are satisfied with the traction force control in the on state. The determination conditions include that the work situation is digging, that the operation amount of the acceleration operation member is the predetermined operation threshold or more, and that the boom angle is the predetermined angle threshold or more. As a result, the satisfying of the determination conditions has the meaning that lifting work is being performed. In the wheel loader according to the aspect, it is possible to obtain sufficient traction force during lifting work by the maximum traction force being automatically increased in such a state. In addition, it is possible to suppress a reduction in operability since it is not necessary for an operation to be performed in order for the operator to increase the maximum traction force.

In the wheel loader according to the second aspect of the present invention, the maximum traction force is reduced to the maximum traction force at the standard level by the traction three control. Then, the maximum traction force is automatically increased from the maximum traction force at the standard level to the maximum traction force at the high level when the determination conditions are satisfied. Due to this, it is possible to obtain sufficient traction power during lifting work and it is possible to suppress a reduction in operability.

In the wheel loader according to the third aspect of the present invention, the maximum traction force at the high level is smaller than the maximum traction force with the traction force control in the off state. Accordingly, it is possible to prevent the maximum traction force from excessively increasing when the determination conditions are satisfied.

In the wheel loader according to the fourth aspect of the present invention, it is possible to change the size of the maximum traction force at the standard level using the traction force level changing section. Then, the maximum traction force automatically increases to a value which is larger than the maximum traction force at the standard level when the determination conditions are satisfied. Due to this, it is possible for the operator to more precisely set the necessary maximum traction force according to the circumstance at the work.

In the wheel loader according to the fifth aspect of the present invention, the maximum traction force is significantly increased when the determination conditions are satisfied even when the maximum traction force at the standard level is set to a small value by the traction force level changing section. Due to this, it is possible for the wheel loader to obtain sufficient traction force during lifting work.

In the wheel loader according to the sixth aspect of the present invention, it is possible to obtain a large traction force when the determination conditions are satisfied.

In the wheel loader according to the seventh aspect of the present invention, the maximum traction force returns to the maximum traction force at the standard level when the determination conditions are no longer satisfied with the traction force control in the on state. Due to this, it is possible to obtain the maximum traction force which is appropriate according to the circumstance at the work.

In the wheel loader according to the eighth aspect of the present invention, it is possible for the operator to immediately execute the control level of the traction force by selecting from a plurality of levels. In addition, it is possible for the operator to obtain sufficient maximum traction force during lifting work since the maximum traction force is increased more than the level selected by the operator when the determination conditions are satisfied.

In the wheel loader according to the ninth aspect of the present invention, the maximum traction force is increased to one level higher than the level selected by the operator when the determination conditions are satisfied. That is, there is less of a sense of unease with regard to operation for the operator since increased maximum traction force is at a level which is able to be selected by the operator. Due to this, it is possible to suppress a reduction in operability.

In the wheel loader according to the tenth aspect of the present invention, the maximum traction force returns to the maximum traction force at the original level when the determination conditions are no longer satisfied with the traction force control in the on state. Due to this, it is possible to obtain the maximum traction tierce which is appropriate according to the circumstance at the work.

In the wheel loader according to the eleventh aspect of the present invention, the maximum traction force is maintained during standard traction force control since an increase in the traction force is not necessary when the work situation is not digging. Alternatively, it is sufficient if the maximum traction force is returned to the maximum traction force during standard traction force control in a case where the maximum traction force is increased already more than the maximum traction force during standard traction tierce control.

In the wheel loader according to the twelfth aspect of the present invention, the maximum traction force is maintained during standard traction force control since an increase in the traction force is not necessary when the operation amount of the acceleration operation member is not the predetermined operation threshold or more. Alternatively, it is sufficient if the maximum traction force is maintained at its current state in a case where the maximum traction force is increased already more than the maximum traction force during standard traction force control.

In the wheel loader according to the thirteenth aspect of the present invention, the maximum traction force is maintained during standard traction force control since an increase in the traction force is not necessary when the boom angle is not the predetermined angle threshold or more. Alternatively, it is sufficient if the maximum traction force is returned to the maximum traction force during standard traction force control in a case where the maximum traction force is increased already more than the maximum traction force during standard traction force control. Here, the angle threshold may take values which are each different when increasing or when decreasing the maximum traction force.

In the wheel loader according to the fourteenth aspect of the present invention, it is possible to accurately determine whether or not the work situation is digging based on the movement state of the vehicle and the action state of the working implement.

In the wheel loader according to the fifteenth aspect of the present invention, it is possible for the maximum traction force to be controlled by controlling the upper limit displacement of the movement hydraulic motor In the wheel loader according to the sixteenth aspect of the present invention, the maximum traction force with the traction force control in the on state is changed by the traction force control section changing the traction force ratio.

In the wheel loader according to the seventeenth aspect of the present invention, the control level of the maximum traction force is increased by the traction force control section increasing the traction force ratio by a predetermined proportion.

In the wheel loader control method according to the eighteenth aspect of the present invention, the maximum traction force is increased when the determination conditions are satisfied with the traction force control in the on state. The determination conditions include that the work situation is digging, that the operation amount of the acceleration operation member is the predetermined operation threshold or more, and that the boom angle is the predetermined angle threshold or more. As a result, the satisfying of the determination conditions has the meaning that lifting work is being performed. In the wheel loader according to the aspect, it is possible to obtain sufficient traction force during lifting work by the maximum traction force being automatically increased in such a state. In addition, it is possible to suppress a reduction in operability since it is not necessary for an operation to be performed in order for the operator to increase the maximum traction force.

BRIEF DESCRIPTION OF DRAWINGS

FIG. 13 is a flowchart illustrating a process for determining whether or not a boom pressure reduction flag is on.

DESCRIPTION OF EMBODIMENTS

Figure 1:
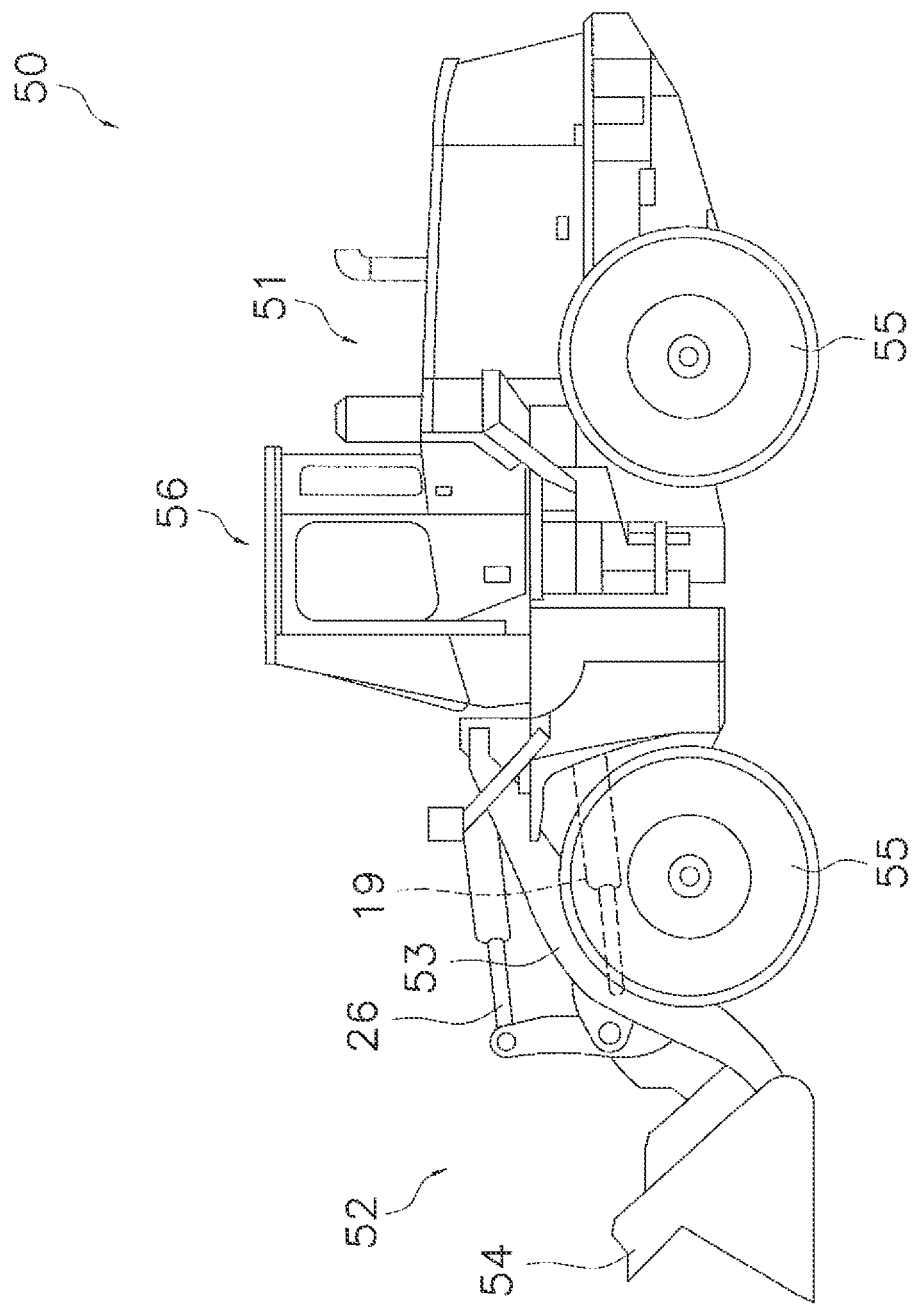
FIG. 1 is a side view diagram of a wheel loader according to an embodiment of the present invention.

Below, a wheel loader 50 according to an embodiment of the present invention will be described using the diagrams. FIG. 1 is a side view diagram of the wheel loader 50. The wheel loader 50 is provided with a vehicle body 51, a working implement 52, a plurality of tires 55, and a cab 56. The working implement 52 is attached to a front portion of the vehicle body 51. The working implement 52 has a boom 53, a bucket 54, a lift cylinder 19, and a bucket cylinder 26. The boom 53 is a member for lifting the bucket 54. The boom 53 is driven by the lift cylinder 19. The bucket 54 is attached to a tip edge of the boom 53. The bucket 54 carries out dumping and tilting using the bucket cylinder 26. The cab 56 is mounted on the vehicle body 51.

Figure 2:
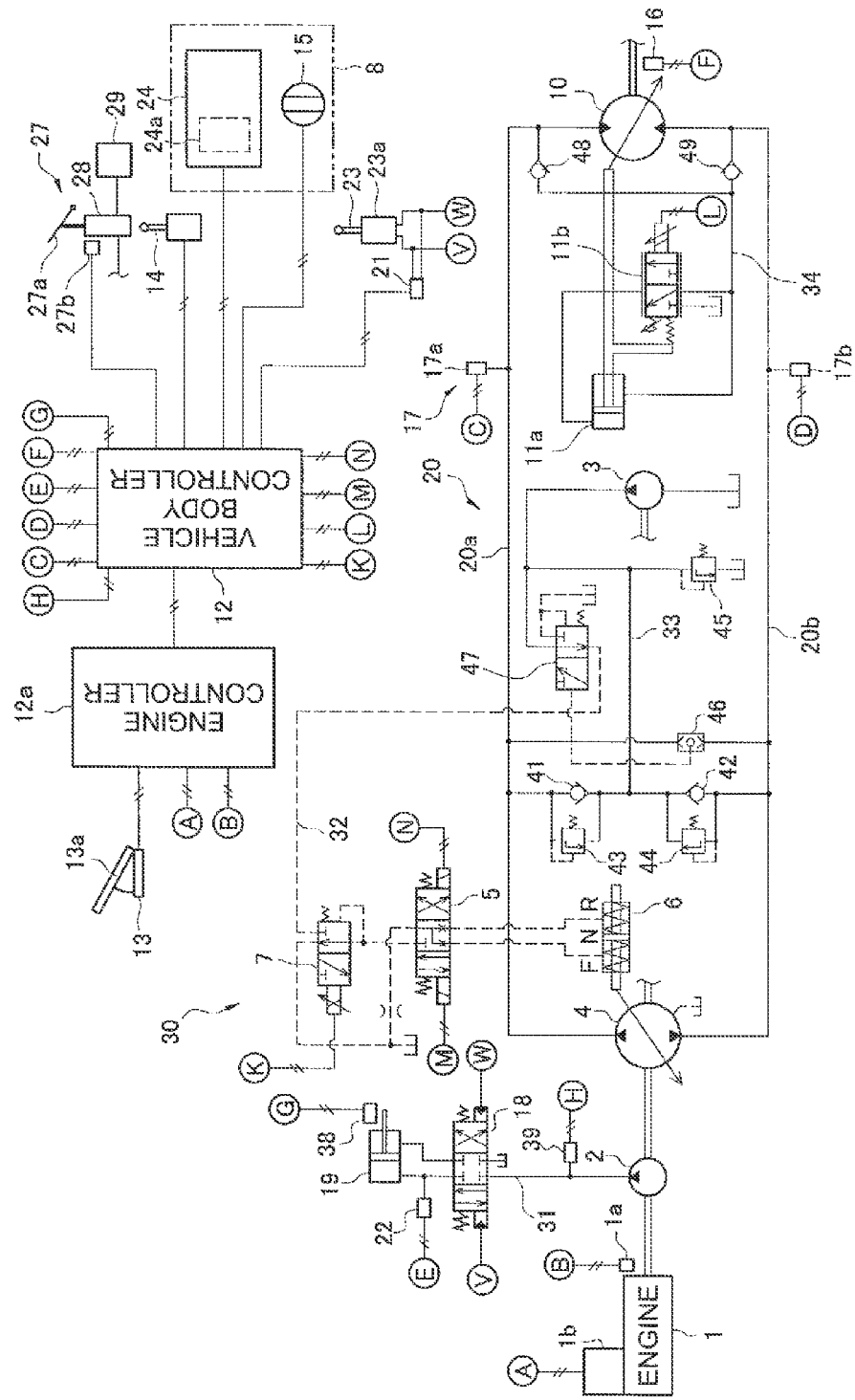
FIG. 2 is a block diagram illustrating a configuration of a hydraulic driving mechanism which is mounted in the wheel loader.

FIG. 2 is a block diagram illustrating a configuration of a hydraulic driving mechanism 30 which is mounted in the wheel loader 50. The hydraulic driving mechanism 30 mainly has an engine 1, a first hydraulic pump 4, a second hydraulic pump 2, a charge pump 3, a movement hydraulic motor 10, an engine controller 12a, a vehicle body controller 12, and a drive hydraulic circuit 20. In the hydraulic driving mechanism 30, hydraulic fluid is discharged due to the first hydraulic pump 4 being driven by the engine 1. The movement hydraulic motor 10 is driven by the hydraulic fluid which is discharged from the first hydraulic pump 4. Then, the wheel loader 50 moves due to the movement hydraulic motor 10 rotationally driving the tires 55 described above. That is, a so-called HST system with one pump and one motor is adopted in the hydraulic driving mechanism 30.

The engine 1 is a diesel engine and the output torque which is generated by the engine 1 is transmitted to the second hydraulic pump 2, the charge pump 3, the first hydraulic pump 4, and the like. An engine rotation speed sensor 1a which detects the actual rotation speed of the engine 1 is provided in the hydraulic driving mechanism 30. In addition, a fuel injection device 1b is connected to the engine 1. The engine controller it 2a which will be described later controls the output torque (referred to below as "engine torque") and the rotation speed of the engine 1 by controlling the fuel injection device 1b.

The first hydraulic pump 4 discharges the hydraulic fluid due to being driven by the engine 1. The first hydraulic pump 4 is a variable displacement type of hydraulic pump. The hydraulic fluid which is discharged from the first hydraulic pump 4 is sent to the movement hydraulic motor 10 by being passed through the drive hydraulic circuit 20. Specifically, the drive hydraulic circuit 20 has a first drive circuit 20a and a second drive circuit 20b. The movement hydraulic motor 10 is driven in one direction (for example, a forward direction) by the hydraulic fluid being supplied to the movement hydraulic motor 10 from the first hydraulic pump 4 via the first drive circuit 20a. The movement hydraulic motor 10 is driven in another direction for example, a reverse direction) by the hydraulic fluid being supplied to the movement hydraulic motor 10 from the first hydraulic pump 4 via the second drive circuit 20b.

A drive circuit pressure detection section 17 is provided in the drive hydraulic circuit 20. The drive circuit pressure detection section 17 detects the pressure of the hydraulic fluid (referred to below as "drive circuit pressure") which is supplied to the movement hydraulic motor 10 via the first drive circuit 20a or the second drive circuit 20b. Specifically, the drive circuit pressure detection section 17 has a first drive circuit pressure sensor 17a and a second drive circuit pressure sensor 17b. The first drive circuit pressure sensor 17a detects the fluid pressure of the first drive circuit 20a. The second drive circuit pressure sensor 17b detects the fluid pressure of the second drive circuit 20b. The first drive circuit pressure sensor 17a and the second drive circuit pressure sensor 17b send detection signals to the vehicle body controller 12. In addition, an FR switching section 5 and a pump displacement control cylinder 6 for controlling the discharge direction of the first hydraulic pump 4 are connected in the first hydraulic pump 4.

The FR switching section 5 is an electromagnetic control valve which switches the supply direction of the hydraulic fluid to the pump displacement control cylinder 6 based on a control signal from the vehicle body controller 12. The FR switching section 5 switches the discharge direction of the first hydraulic pump 4 by switching the supply direction of the hydraulic fluid to the pump displacement control cylinder 6. Specifically, the FR switching section 5 switches the discharge direction of the first hydraulic pump 4 between discharging to the first drive circuit 20a and discharging to the second drive circuit 20b. Due to this, the drive direction of the movement hydraulic motor 10 is changed. The pump displacement control cylinder 6 is driven due to the hydraulic fluid being supplied via a pump pilot circuit 32 and changes the inclination angle of the first hydraulic pump 4.

A pump displacement control section 7 is arranged in the pump pilot circuit 32. The pump displacement control section 7 connects the pump displacement control cylinder 6 to either the pump pilot circuit 32 or a hydraulic fluid tank. The pump displacement control section 7 is an electromagnetic control valve which is controlled based on a control signal from the vehicle body controller 12. The pump displacement control section 7 adjusts the inclination angle of the first hydraulic pump 4 by controlling the pressure of the hydraulic fluid in the pump displacement control cylinder 6.

The pump pilot circuit 32 is connected to a charge circuit 33 and the hydraulic fluid tank via a cut off valve 47. A pilot port of the cut off valve 47 is connected to the first drive circuit 20a and the second drive circuit 20b via a shuttle valve 46. The shuttle valve 46 introduces the larger out of the fluid pressure of the first drive circuit 20a and the fluid pressure of the second drive circuit 20b into the pilot port of the cut off valve 47. That is, the drive circuit pressure is applied to the pilot port of the cut off valve 47. The cut off valve 47 links the charge circuit 33 and the pump pilot circuit 32 when the drive circuit pressure is lower than a predetermined cut off pressure. Due to this, the hydraulic fluid is supplied from the charge circuit 33 to the pump pilot circuit 32. When the drive circuit pressure is the predetermined cut off pressure or more, the cut off valve 47 links the pump pilot circuit 32 to the hydraulic fluid tank and the hydraulic fluid in the pump pilot circuit 32 escapes into the hydraulic fluid tank. Due to this, the displacement of the first hydraulic pump 4 is reduced and an increase in the drive circuit pressure is suppressed due to the fluid pressure in the pump pilot circuit 32 being reduced.

The charge pump 3 is driven by the engine 1 and is a pump for supplying the hydraulic fluid to the drive hydraulic circuit 20. The charge pump 3 is connected to the charge circuit 33. The charge pump 3 supplies the hydraulic fluid to the pump pilot circuit 32 via the charge circuit 33. The charge circuit 33 is connected to the first drive circuit 20a via a first check valve 41. The first check valve 41 permits flow of the hydraulic fluid from the charge circuit 33 to the first drive circuit 20a, but restricts flow of the hydraulic fluid from the first drive circuit 20a to the charge circuit 33. In addition, the charge circuit 33 is connected to the second drive circuit 20b via a second check valve 42. The second check valve 42 permits flow of the hydraulic fluid from the charge circuit 33 to the second drive circuit 20b, but restricts flow of the hydraulic fluid from the second drive circuit 20b to the charge circuit 33. In addition, the charge circuit 33 is connected to the first drive circuit 20a via a first relief valve 43. The first relief valve 43 is open when the fluid pressure of the first drive circuit 20a is larger than a predetermined pressure. The charge circuit 33 is connected to the second drive circuit 20b via a second relief valve 44. The second relief valve 44 is open when the fluid pressure of the second drive circuit 20b is larger than a predetermined pressure. In addition, the charge circuit 33 is connected to the hydraulic fluid tank via a low-pressure relief valve 45. The low-pressure relief valve 45 is opened when the fluid pressure of the charge circuit 33 is larger than a predetermined relief pressure. Due to this, the drive circuit pressure is adjusted so that the predetermined relief pressure is not exceeded. In addition, the predetermined relief pressure of the low-pressure relief valve 45 is very low compared to the relief pressure of the first relief valve 43 and the relief pressure of the second relief valve 44. Accordingly, the hydraulic fluid is supplied from the charge circuit 33 to the drive hydraulic circuit 20 via the first check valve 41 or the second check valve 42 when the drive circuit pressure is lower than the fluid pressure of the charge circuit 33.

The second hydraulic pump 2 is driven by the engine 1. The hydraulic fluid which is discharged from the second hydraulic pump 2 is supplied to the lift cylinder 19 via a working implement hydraulic circuit 31. Due to this, the working implement 52 is driven. The discharge pressure of the second hydraulic pump 2 is detected by a discharge pressure sensor 39. The discharge pressure sensor 39 sends a detection signal to the vehicle body controller 12. A working implement control valve 18 is provided in the working implement hydraulic circuit 31. The working implement control valve 18 is driven according to the operation amount of a working implement operation member 23. The working implement control valve 18 controls the flow rate of the hydraulic fluid which is supplied to the lift cylinder 19 according to pilot pressure which is applied to the pilot port. The pilot pressure which is applied to the pilot port of the working implement control valve 18 is controlled by a pilot valve 23a of the working implement operation member 23. The pilot valve 23a applies the pilot pressure to the pilot port of the working implement operation valve 18 according to the operation amount of the working implement operation member 23. Due to this, the lift cylinder 19 is controlled according to the operation amount of the working implement operation member 23. The pilot pressure which is applied to the pilot port of the working implement control valve 18 is detected by a PCC pressure sensor 21. In addition, the pressure of the hydraulic fluid which is supplied to the lift cylinder 19 is detected by a boom pressure sensor 22. The PPC pressure sensor 21 and the boom pressure sensor 22 send detection signals to the vehicle body controller 12. In addition, a boom angle detection section 38 is provided in the lift cylinder 19. The boom angle detection section 38 detects the boom angle which will be described later. The boom angle detection section 38 is a sensor which detects the rotation angle of the boom 53. Alternatively, the boom angle detection section 38 may detect the stroke amount of the lift cylinder 19 and the rotation angle of the boom 53 may be calculated from the stroke amount. The boom angle detection section 38 sends a detection signal to the vehicle body controller 12. Here, the bucket cylinder 26 is also controlled using a control valve in the same manner as the lift cylinder 19, but the diagrammatical representation thereof is omitted in FIG. 2.

The movement hydraulic motor 10 is a variable displacement type of hydraulic motor. The movement hydraulic motor 10 is driven by the hydraulic fluid which is discharged from the first hydraulic pump 4 and a driving force for movement is generated. A motor cylinder 11a and a motor displacement control section 11b are provided in the movement hydraulic motor 10. The motor cylinder 11a changes the inclination angle of the movement hydraulic motor 10. The motor displacement control section 11b is an electromagnetic control valve which is controlled based on a control signal from the vehicle body controller 12. The motor displacement control section 11b controls the motor cylinder 11a based on the control signal from the vehicle body controller 12. The motor cylinder 11a and the motor displacement control section 11b are connected to a motor pilot circuit 34. The motor pilot circuit 34 is connected to the first drive circuit 20a via a check valve 48. The check valve 48 permits flow of the hydraulic fluid from the first drive circuit 20a to the motor pilot circuit 34, but restricts flow of the hydraulic fluid from the motor pilot circuit 34 to the first drive circuit 20a. The motor pilot circuit 34 is connected to the second drive circuit 20b via a check valve 49. The check valve 49 permits flow of the hydraulic fluid from the second drive circuit 20b to the motor pilot circuit 34, but restricts flow of the hydraulic fluid from the motor pilot circuit 34 to the second drive circuit 20b. The fluid pressure which is the larger out of the first drive circuit 20a and the second drive circuit 20b, that is, the hydraulic fluid of the drive circuit pressure, is supplied to the motor pilot circuit 34 by the check valves 48 and 49. The motor displacement control section 11b switches the supply direction and the supply flow rate of the hydraulic fluid from the motor pilot circuit 34 to the motor cylinder 11a based on the control signal from the vehicle body controller 12. Due to this, it is possible for the vehicle body controller 12 to arbitrarily change the displacement of the movement hydraulic motor 10. In addition, it is possible to arbitrarily set the upper limit displacement and the lower limit displacement of the movement hydraulic motor 10.

A vehicle speed sensor 16 is provided in the hydraulic driving mechanism 30. The vehicle speed sensor 16 detects vehicle speed. The vehicle speed sensor 16 sends a detection signal to the vehicle body controller 12. The vehicle speed sensor 16 detects the vehicle speed by, for example, detecting the rotation speed of the tire driving shaft.

The wheel loader 50 is provided with an acceleration operation member 13a, a forward and reverse switching operation member 14, a traction force control operation section 8, and an inching operation section 27.

The acceleration operation member 13a is a member for the operator to set the target rotation speed of the engine it. The acceleration operation member 13a is, for example, an acceleration pedal and is operated by the operator. The acceleration operation member 13a is connected to an acceleration operation amount sensor 13. The acceleration operation amount sensor 13 is configured by a potentiometer or the like. The acceleration operation amount sensor 13 sends a detection signal which indicates the operation amount of the acceleration operation member 13a (referred to below as "acceleration operation amount") to the engine controller 12a. It is possible for the operator to control the rotation speed of the engine 1 by adjusting the acceleration operation amount.

The forward and reverse switching operation member 14 is operated by the operator and is switched to a forward position, a reverse position, and a neutral position. The forward and reverse switching operation member 14 sends a detection signal which indicates the position of the forward and reverse switching operation member 14 to the vehicle body controller 12. It is possible for the operator to switch between forward and reverse of the wheel loader 50 by operating the forward and reverse switching operation member 14.

The traction force control operation section 8 is operated by the operator and is operated in order to switch an on state and an off state of a traction force control. The traction force control is a control where the maximum traction force of the wheel loader 50 is reduced. The maximum traction force is a value which is the peak of the traction force (refer to FIG. 6) which changes according to vehicle speed. Here, in the description below, the traction force control being in the off state has the meaning of a state where the traction force control is not being executed. In addition, the traction force control being in the on state has the meaning of a state where the traction force control is being executed. The traction force control operation section 8 has a traction force control operation member 15 and a setting operation device 24.

The traction three control member 15 is, for example, a switch. The traction force control member 15 is operated by the operator and is operated in order to indicate the execution of the traction three control which will be described later. The traction force control will be described in detail later. The traction force control operation member 15 sends a detection signal, which indicates the selection position of the traction force control operation member 15, to the vehicle body controller 12.

The setting operation device 24 is a device for performing various types of settings of the wheel loader 50. The setting operation device 24 is, for example, a display device with a touch panel function. The setting operation device 24 has a traction force level changing section 24a. As will be described later, the control level of the traction force is set to a standard level in the traction force control. The maximum traction force at the standard level is smaller than the maximum traction force with the traction force control in the off state. It is possible for the size of the maximum traction force at the standard level in the traction force control to be changed to a plurality of levels by the operator operating the traction force level changing section 24a.

The inching operation section 27 has an inching operation member 27a and an inching operation sensor 27b. The inching operation member 27a is operated by the operator. The inching operation member 27a is, for example, a pedal. The inching operation member 27a is used as both an inching operation function and a brake operation function which will be described later. The inching operation sensor 27b detects the operation amount of the inching operation member 27a (referred to below as "inching operation amount") and transmits a detection signal to the vehicle body controller 12. When the inching operation member 27a is operated, the vehicle body controller 12 controls the pump displacement control section 7 based on the detection signal from the inching operation sensor 27b. The vehicle body controller 12 reduces the fluid pressure of the pump pilot circuit 32 according to the operation amount of the inching operation member 27a. Due to this, the rotation speed of the movement hydraulic motor 10 is reduced by reducing the drive circuit pressure. The inching operation section 27 is used when, for example, there is a desire to suppress an increase in the movement speed and increase the rotation speed of the engine 1. That is, when the rotation speed of the engine 1 increases due to the operation of the acceleration operation member 13a, the fluid pressure of the pump pilot operation member 32 also increases. At this time, it is possible to control an increase in the fluid pressure of the pump pilot circuit 32 by operating the inching operation member 27a. Due to this, it is possible to suppress an increase in the displacement of the first hydraulic pump 4 and to suppress an increase in the rotation speed of the movement hydraulic motor 10. In other words, the inching operation member 27a is operated in order to reduce the vehicle speed without reducing the engine rotation speed.

In addition, a brake valve 28 is linked to the inching operation member 27a. The brake valve 28 controls the supply of the hydraulic fluid to a hydraulic brake device 29. The inching operation member 27a is also used as an operation member of the hydraulic brake device 29. Only the inching operation described above is performed based on the detection signal from the inching operation sensor 27b until the operation amount of the inching operation member 27a reaches a predetermined amount. Then, when the operation amount of the inching operation member 27a reaches the predetermined amount, the operation of the brake valve 28 starts, and due to this, a braking force is generated in the hydraulic brake device 29. The braking force of the hydraulic brake device 29 is controlled according to the operation amount of the inching operation member 27a when the operation amount of the inching operation member 27a is the predetermined amount or more.

Figure 3:
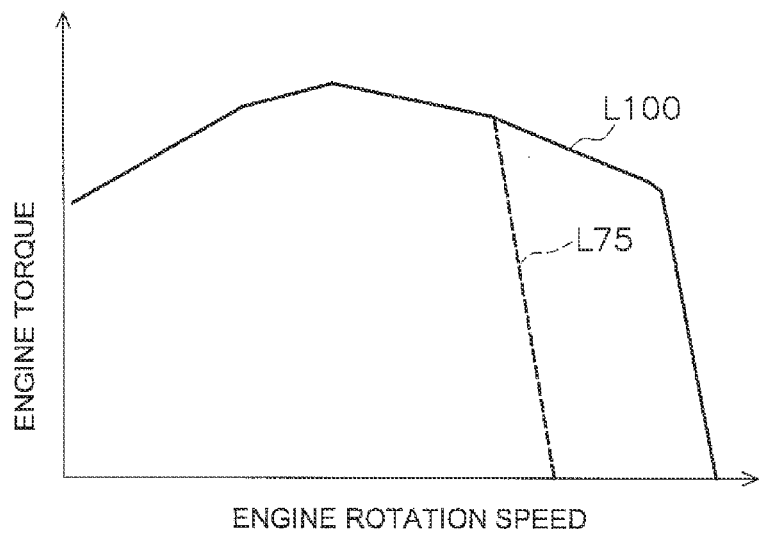
FIG. 3 is a diagram illustrating output torque curves of an engine.

The engine controller 12a is an electronic control section which has a computation device such as a CPU, various types of memory, and the like. The engine controller 12a controls the engine 1 so that the target rotation speed which has been set is obtained. Output torque curves of the engine 1 are shown in FIG. 3. The output torque curves of the engine 1 show the relationship between the rotation speeds of the engine 1 and the size of the maximum engine torque which is able to be output by the engine 1 in each of the rotation speeds. In FIG. 3, the solid line L100 shows an engine output torque curve when the acceleration operation amount is 100%. This engine output torque curve is equivalent to, for example, a rating of the engine 1 or the maximum power output. Here, an acceleration operation amount of 100% has the meaning of a state where the acceleration operation member 13a is being operated to the maximum. In addition, the dashed line L75 shows an engine output torque curve when the acceleration operation amount is 75%. The engine controller 12a controls the output of the engine 1 so that the engine torque is the engine output torque curve or less. The control of the engine 1 is, for example, performed by controlling the upper value of the fuel injection amount to the engine 1.

The vehicle body controller 12 is an electronic control section which has a computation device such as a CPU, various types of memory, and the like. The vehicle body controller 12 controls the displacement of the first hydraulic pump 4 and the displacement of the movement hydraulic motor 10 by each control valve being electronically controlled based on detection signals from each detection section.

Figure 4:
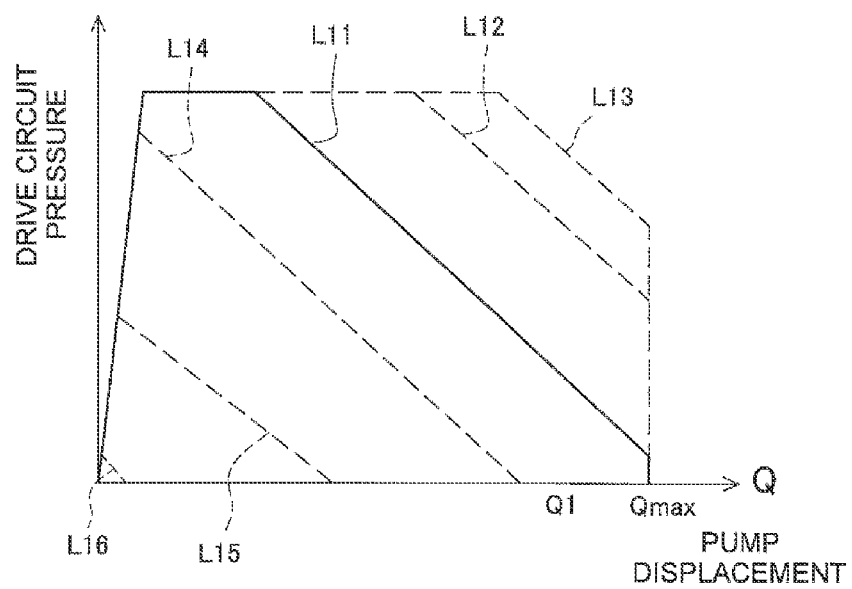
FIG. 4 is a diagram illustrating an example of pump displacement and drive circuit pressure characteristics.

Specifically, the vehicle body controller 12 outputs a command signal to the pump displacement control section 7 based on the engine rotation speed which is detected by the engine rotation speed sensor 1a. Due to this, the relationship between the pump displacement and the drive circuit pressure is regulated. An example of pump displacement and drive circuit pressure characteristics is shown in FIG. 4. The pump displacement and drive circuit pressure characteristics show the relationship of the pump displacement and the drive circuit pressure. L11 to L16 in the diagram are lines which indicate the pump displacement and drive circuit pressure characteristics which change according to the engine rotation speed. Specifically, the pump displacement and drive circuit pressure characteristics are changed in L11 to L16 due to the flow rate of the pump displacement control section 7 being controlled by the vehicle body controller 12 based on the engine rotation speed. Due to this, the pump displacement is controlled to be a size which corresponds to the engine rotation speed and the drive circuit pressure.

Figure 5:
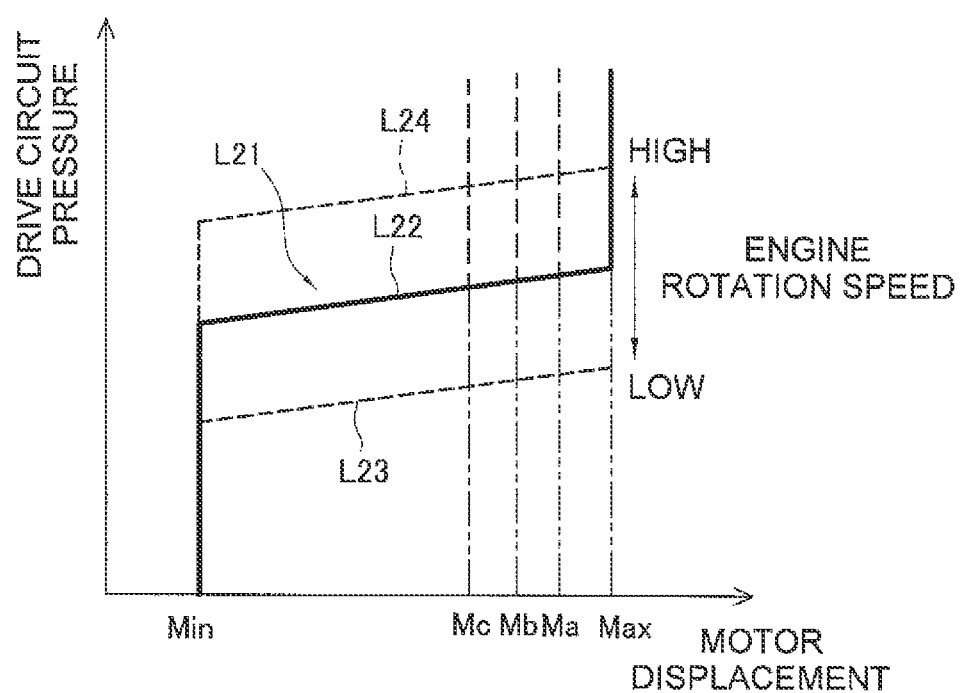
FIG. 5 is a diagram illustrating an example of motor displacement and drive circuit pressure characteristics.
Figure 6:
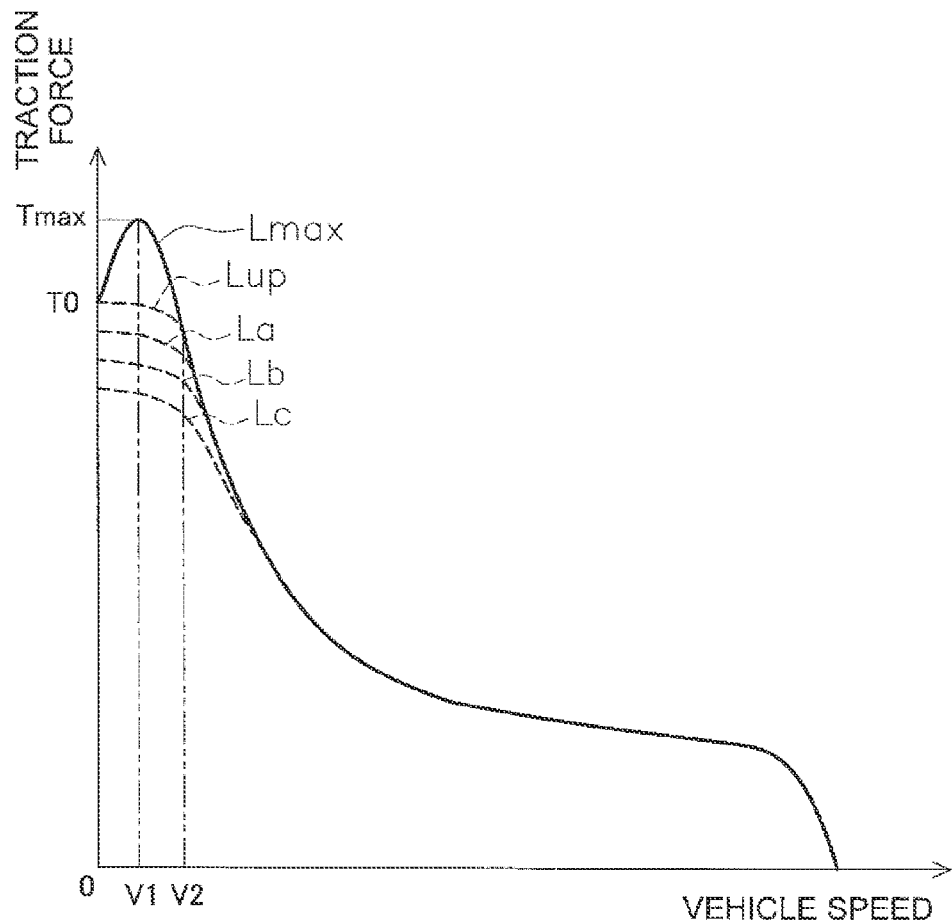
FIG. 6 is a diagram illustrating an example of a vehicle speed and traction force line diagram of the wheel loader.

The vehicle body controller 12 processes the detection signals from the engine rotation speed sensor 1a and the drive circuit pressure detection section 17 and outputs the command signal of the motor displacement to the motor displacement control section 11b. Here, the vehicle body controller 12 references the motor displacement and drive circuit pressure characteristics which are stored in the vehicle body controller 12 and sets the motor displacement from the value of the engine rotation speed and the value of the drive circuit pressure. The vehicle body controller 12 outputs a change command for the inclination angle, which corresponds to the motor displacement which has been set, to the motor displacement control section 11b. An example of motor displacement and drive circuit pressure characteristics is shown in FIG. 5. The solid line L21 in the diagram is a line where the motor displacement has been set with regard to the drive circuit pressure in a state where the engine rotation speed is a certain value. The motor displacement in this case corresponds to the inclination angle of the movement hydraulic motor 10. The inclination angle is a minimum (Min) until a case where the drive circuit pressure is a certain value or more. After this, the inclination angle also gradually becomes larger in accompaniment with an increase in the drive circuit pressure (the inclined portion L22 of the solid line). Then, after the inclination angle becomes a maximum (Max), the inclination angle is maintained at the maximum inclination angle (Max) even if the drive circuit pressure increases. The inclined portion 122 regulates the target pressure of the drive circuit pressure. That is, the vehicle body controller 12 increases the displacement of the movement hydraulic motor when the drive circuit pressure is larger than the target pressure. In addition, the displacement of the movement hydraulic motor is reduced when the drive circuit pressure is smaller than the target pressure. The target pressure is set according to the engine rotation speed. That is, the inclined portion L22 shown in FIG. 5 is set so as to rise and fall according to increases and decreases in the engine rotation speed. Specifically, with regard to the inclined portion L22, the inclination angle becomes larger from a state where the drive circuit pressure is lower if the engine rotation speed is low and is controlled so as to reach the maximum inclination angle in a state where the drive circuit pressure is lower (refer to the inclined portion L23 of the dashed line at the lower side in FIG. 5). Conversely, the inclination angle is maintained at the minimum inclination angle (Min) until the drive circuit pressure is higher if the engine rotation speed is high and is controlled so as to reach the maximum inclination angle (Max) in a state where the drive circuit pressure is higher (refer to the inclined portion 124 of the dashed line at the upper side in FIG. 5). Due to this, as shown in FIG. 6, it is possible for the wheel loader 50 to automatically change speed without an operation to change speed from a vehicle speed of zero to the maximum vehicle speed by the traction force and the vehicle speed being changed in a stepless manner. Here, the inclined portion L22 in FIG. 5 is shown with the inclination being emphasized for simplicity of understanding and is actually substantially horizontal in practice. Accordingly, when the drive circuit pressure reaches the target pressure, the motor displacement is switched between a minimum value (or a lower limit value) and a maximum value (or upper limit value). However, the command value is not changed immediately when the drive circuit pressure reaches the target pressure and a time delay is generated. The time delay is a reason why the inclined portion L22 exists. In FIG. 6, Lmax is vehicle speed and traction force characteristics with the traction force control in the off state. In the vehicle speed and traction force characteristics Lmax with the traction force control in the off state, the traction force is the maximum traction force Tmax when the vehicle speed is a first vehicle speed V1 which is larger than zero. With the vehicle speed at the first vehicle speed V1 or less, the traction force becomes smaller as the vehicle speed becomes smaller. In addition, with the vehicle speed at the first vehicle speed V1 or more, the traction force becomes smaller as the vehicle speed becomes larger.

The vehicle body controller 12 executes the traction force control by the traction force control operation member 15 being operated. The vehicle body controller 12 changes the maximum traction force of the vehicle by changing the upper limit displacement of the movement hydraulic motor 10. For example, the vehicle body controller 12 outputs a command signal of the motor displacement control section 11b so that the upper limit displacement is changed from Max to any of Ma, Mb, or Mc as shown in FIG. 5. When upper limit displacement is changed to Ma, the vehicle speed and traction force characteristics change in the same manner as the line La in FIG. 6. In this manner, the maximum traction force is reduced compared to the line Lmax which indicates the vehicle speed and traction force characteristics in a state where the traction force control is not performed. When the upper limit displacement is changed to Mb, the maximum traction force is further reduced by the vehicle speed and traction force characteristics being changed in the same manner as the line Lb. In addition, when the upper limit displacement is changed to Mc, the maximum traction force is even further reduced by the vehicle speed and traction force characteristics being changed in the same manner as the line Lc.

The maximum traction force of the vehicle is reduced in the traction force control to the maximum traction force at the standard level which is set in advance. It is possible for the size of the maximum traction force at the standard level in the traction force control to be set by being selected from a plurality of levels in advance by the operator operating the traction force level changing section 24a described above. Specifically, it is possible for the traction force level changing section 24a to select a level which is set as the standard level from levels in the three stages of level A, level B, and level C. Level A is a level of traction force which corresponds to the upper limit displacement Ma described above. Level B is a level of traction force which corresponds to the upper limit displacement Mb described above. Level C is a level of traction force which corresponds to the upper limit displacement Mc described above.

Figure 7:
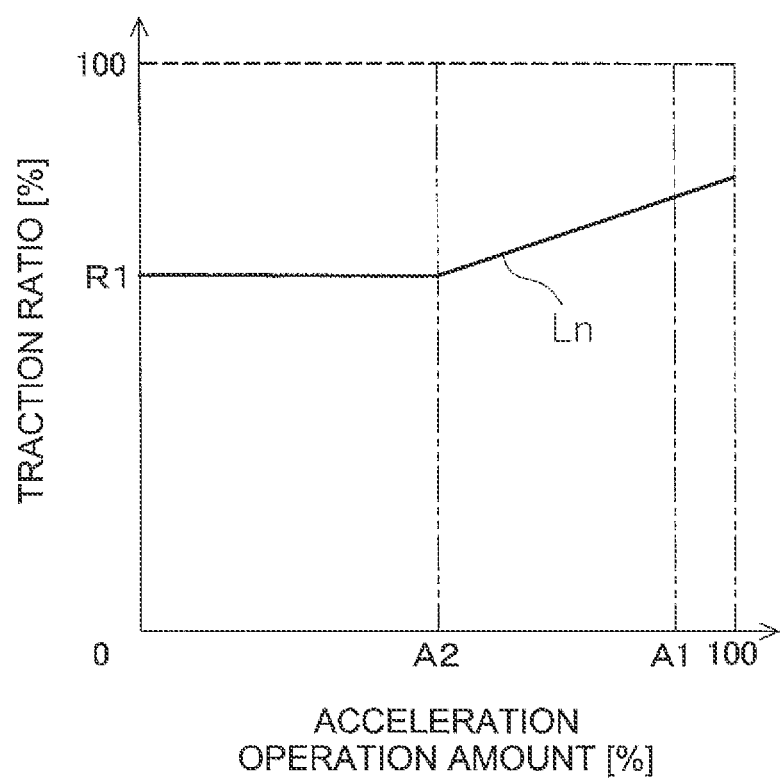
FIG. 7 is a diagram illustrating an example of traction force ratio information.

FIG. 7 shows traction force ratio information which regulates the relationship between the traction force ratio and the acceleration operation amount. The traction force ratio indicates a proportion of the maximum traction force in the traction force control when the maximum traction force with the traction force control in the off state is 100%. Ln in FIG. 7 is traction force ratio information at the standard level. With the traction force ratio information Ln, the traction force ratio is constant at R1 when the acceleration operation amount is a predetermined threshold A2 or less. The traction force ratio increases according to the acceleration operation amount when the acceleration operation amount is larger than the predetermined threshold A2. The vehicle body controller 12 controls the upper limit displacement of the movement hydraulic motor 10 so that the maximum traction force is obtained as shown in the traction force ratio information Ln by the control level of the traction force being set at the standard level in the automatic traction force control. Here, the traction force ratio in the traction force ratio information Ln changes according to the selection result which depends on the traction force level changing section 24a.

The vehicle body controller 12 changes the control level of the traction force from the standard level to the high level in the traction force control when predetermined determination conditions are satisfied. The changing of the control level of the traction force is performed by the traction force ratio described above being increased by a predetermined ratio. Lup in FIG. 6 is vehicle speed and traction force characteristics at a high level. With the vehicle speed and traction force characteristics Lup at the high level, the traction force when the vehicle speed is zero matches the traction force T0 when the vehicle speed is zero with the vehicle speed and traction force characteristics Lmax in a case where the traction force control is in the off state. The vehicle body controller 12 controls the upper limit displacement of the movement hydraulic motor 10 so that the maximum traction force is obtained as shown by the vehicle speed and traction force characteristics Lup when the determination conditions are satisfied in the traction force control. Due to this, the maximum traction force automatically increases. Below, a determination process for automatically increasing the maximum traction force in the traction force control will be described in detail.

Figure 8:
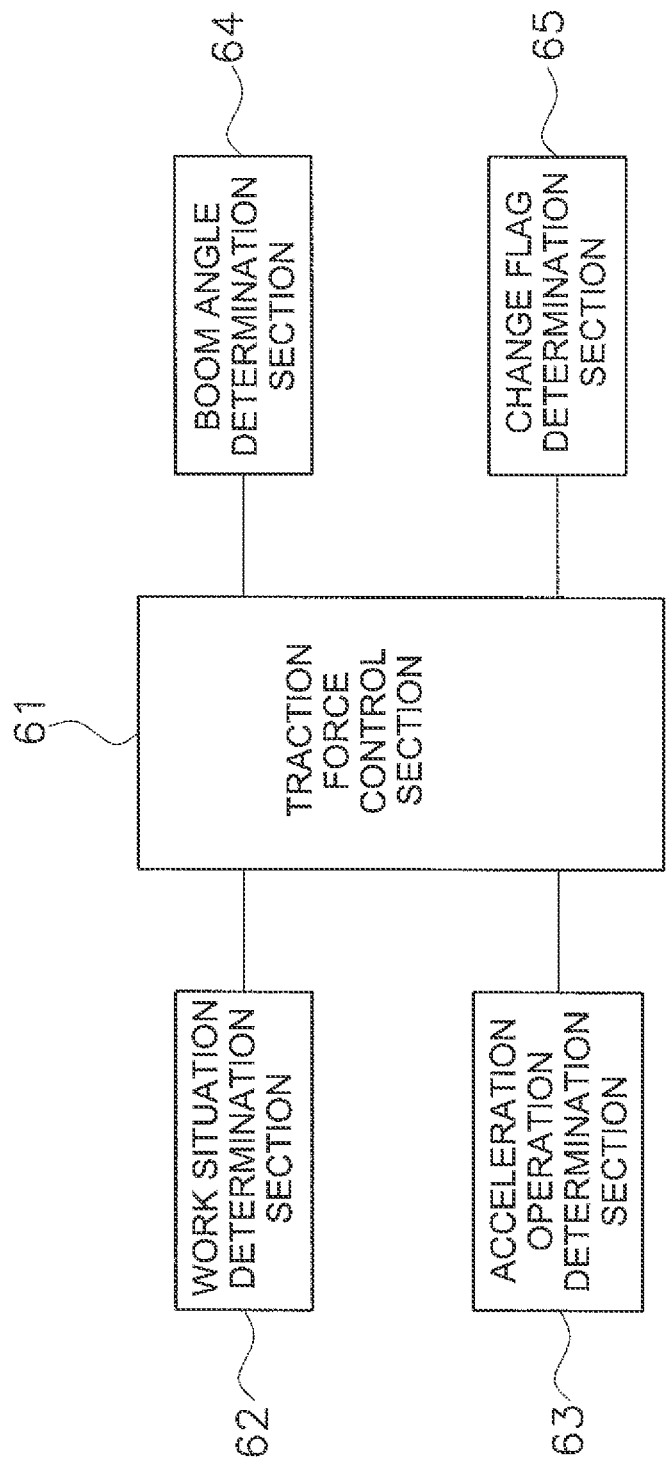
FIG. 8 is a block diagram illustrating a configuration of a vehicle body controller.
Figure 9:
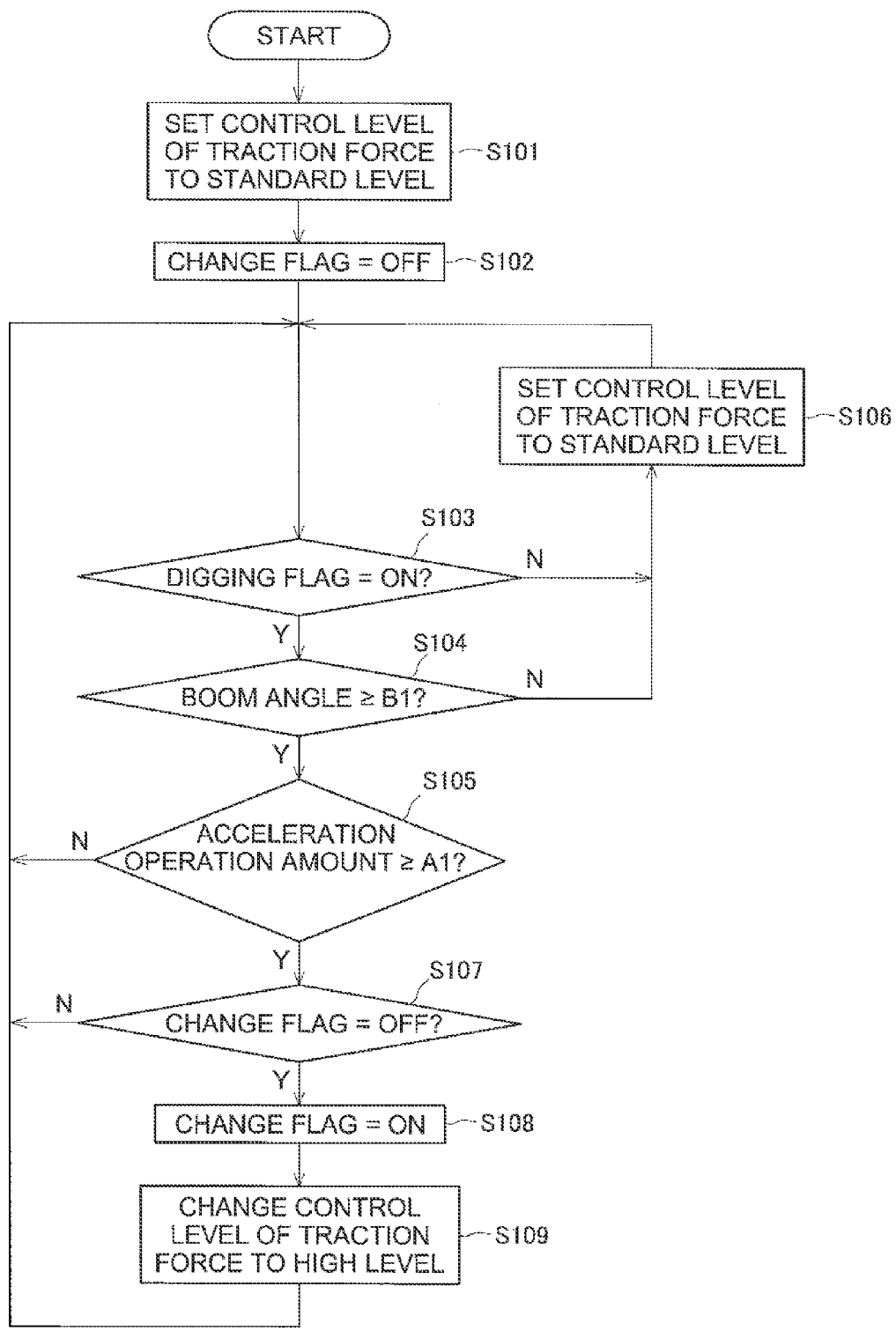
FIG. 9 is a flowchart illustrating a determination process for automatically increasing the maximum traction force in a traction force control.

As shown in FIG. 8, the vehicle body controller 12 has a traction force control section 61, a work situation determination section 62, an acceleration operation determination section 63, a boom angle determination section 64, and a change flag determination section 65. FIG. 9 is a flowchart illustrating a determination process for changing the control level of the traction force from the standard level to the high level in the traction force control. The vehicle body controller 12 executes the process shown in FIG. 9 when the traction force control is set in the on state by the traction force control operation member 15 being operated.

In step S101, the traction force control section 61 sets the control level of the traction force to the standard level. In addition, in step S102, the traction force control section 61 sets a change flag to off. The change flag is set to on in a case where the control level of the traction force is raised from the standard level to the high level. The change flag is set to off in a case where the control level of the traction force is not raised from the standard level to the high level. That is, the traction force control section 61 maintains the control level of the traction force at the standard level in a case where the change flag is off.

Next, in step S103, the work situation determination section 62 determines whether or not a digging flag is on. The digging flag being on has the meaning that the work situation is digging. The work situation determination section 62 determines whether or not the work situation is digging based on the movement state of the vehicle and the action state of the work implement 52. The work situation determination section 62 sets the digging flag to on when it determines that the work situation is digging. The work situation determination section 62 sets the digging flag to off when it determines that the work situation is work other than digging. A specific process for determining the work situation will be described later.

Figure 10:
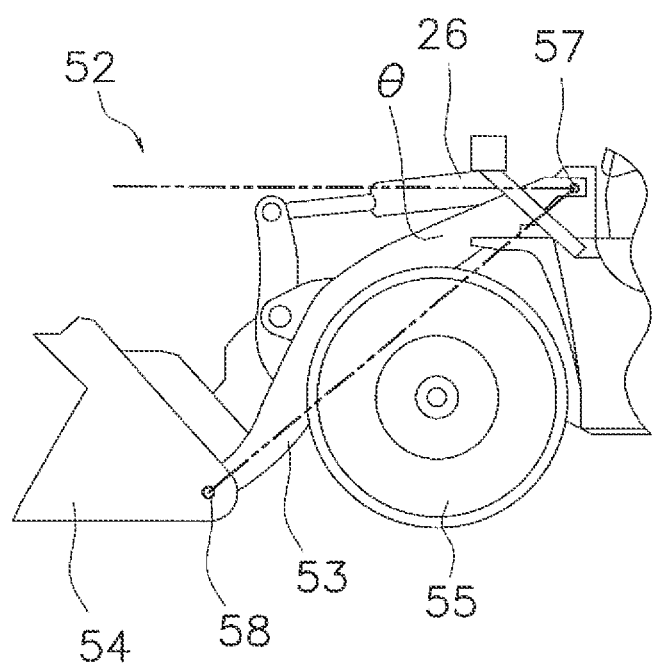
FIG. 10 is a side view diagram of a working implement for illustrating the definition of a boom angle.

In step S104, the boom angle determination section 64 determines whether or not the boom angle is a predetermined angle threshold B1 or more. The boom angle determination section 64 performs the determination described above based on the detection signal from the boom angle detection section 38. The boom angle is an angle θ which is formed between a line which connects a boom pin 57 and a bucket pin 58 and the horizontal direction with the horizontal direction as zero degrees from a side view as shown in FIG. 10. An angle which is lower than the horizontal direction is a negative value and an angle which is higher than the horizontal direction is a positive value. The boom angle is defined so as to increase in an upward direction. The angle threshold 91 is equivalent to a boom angle which is possible during lifting work. For example, the angle threshold B1 is −20 degrees or more. The angle threshold B1 is, for example, −10 degrees.

In step S105, the acceleration operation determination section 63 determines whether or not the acceleration operation amount is a predetermined acceleration threshold A1 or more. The acceleration operation determination section 63 performs the determination described above based on the detection signal from the acceleration operation amount sensor 13. The acceleration threshold A1 is a value which is large enough such that it is possible to interpret that the acceleration operation member 13a is operating at the maximum. The acceleration threshold A1 is a value which is larger than the threshold A2 described above (refer to FIG. 7). For example, it is preferable that the acceleration threshold A1 be 80% or more when the maximum value of the acceleration operation amount be 100%. It is more preferable that the acceleration threshold A1 be 90% or more.

When any one condition of the conditions in step S103 and step S104 are no longer satisfied, the process proceeds to step S106. In step S106, the traction force control section 61 sets the control level of the traction force to the standard level. That is, when any one of the conditions in step S103 and step S104 are no longer satisfied in a state where the control level of the traction force is the standard level, the control level of the traction force is maintained at the standard level. When any one of the conditions in step S103 and step S104 are no longer satisfied in a state where the control level of the traction force is the high level, the control level of the traction force is returned to the standard level from the high level. Accordingly, the traction force control section 61 does not perform increasing of the maximum traction force when the work situation is not digging. The traction force control section 61 does not perform increasing of the maximum traction force when the boom angle is not the predetermined angle threshold B1 or more. Here, the angle threshold may be set to B1 when the control level is raised from the standard level to the high level and may be set as B2 which is smaller than B1 when the control level is lowered from the high level to the standard level.

In a case where the condition in step S105 is not satisfied, the current control level is maintained. That is, the traction force control section 61 does not perform increasing of the maximum traction force when the operation amount of the acceleration operation member 13a is not the predetermined operation threshold A1 or more. This is because operability is lost when the traction force is changed according to the acceleration operation amount during lifting work.

When all of the conditions in step S103 to step S105 are satisfied, the process proceeds to step S107. In step s107, the change flag determination section 65 determines whether or not the change flag is off. That is, the change flag determination section 65 determines whether or not the control level of the traction force is the standard level. In a case where the change flag is off that is, in a case where the control level of the traction force is the standard level, the process proceeds to step S108.

In step S108, the traction force control section 61 sets the change flag to on. In addition, in step S109, the traction force control section 61 changes the control level of the traction force from the standard level to the high level. Due to this, the traction force control section 61 controls the traction force based on the vehicle speed and traction force characteristics Lup shown in FIG. 6. However, as shown in FIG. 6, the maximum traction force at the high level is smaller than the maximum traction force with the traction force control in the off state. In addition, the traction force control section 61 controls the traction force based on the vehicle speed and traction force characteristics Lup shown in FIG. 6 when the determination conditions described above are satisfied even if any of the levels of level A (refer to La in 6), level B (refer to Lb in 6), or level C (refer to Lc in FIG. 6) are selected as the standard level. That is, the maximum traction force at the high level is constant irrespective of the size of the maximum traction force at the standard level which is changed by the traction force level changing section 24a. Specifically, the traction force ratio which corresponds to the high level is constant irrespective of the size of the maximum traction force at the standard level which is changed by the traction force level changing section 24a.

Figure 11:
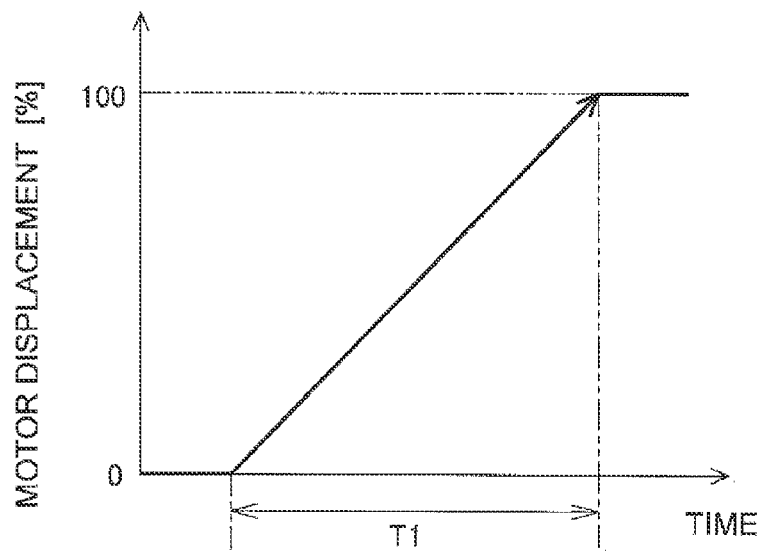
FIG. 11 is a diagram illustrating changing speed of a command value of motor displacement when the motor displacement changes.
Figure 11:
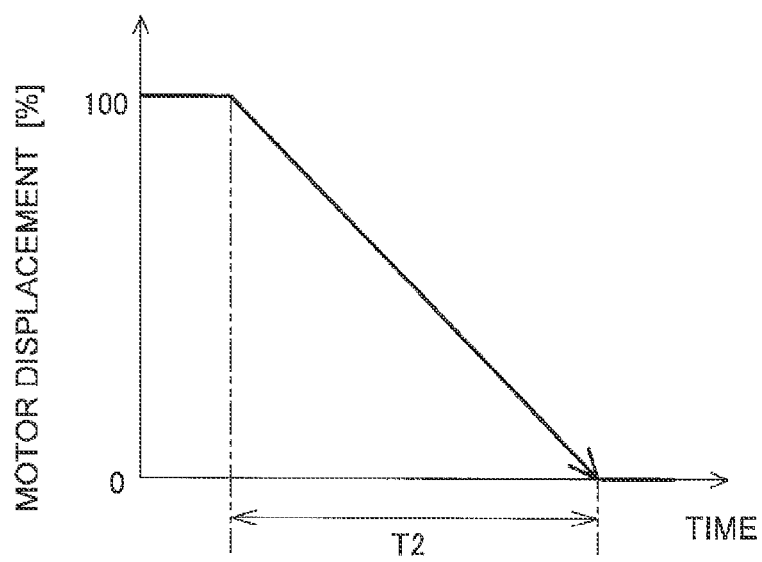

When the control level of the traction force is raised from the standard level to the high level and when the control level of the traction force is returned from the high level to the standard level, the traction force control section 61 changes the traction force at the same speed. That is, when the maximum traction force is increased and when the maximum traction force is lowered in the traction force control, the traction force control section 61 changes the traction force at the same speed. FIG. 11(a) shows the changing speed of a command value of the motor displacement when the motor displacement is increased. That is, FIG. 11(a) shows the changing speed of a command value of the motor displacement when the maximum traction force is increased. FIG. 11(b) shows the changing speed of a command value of the motor displacement when the motor displacement is reduced. That is, FIG. 11(b) shows the changing speed of a command value of the motor displacement when the maximum traction force is reduced. As shown in FIGS. 11(a) and 11(b), a time T1=a time T2. Accordingly, the traction force control section 61 changes the command value of the motor displacement at the same speed when the maximum traction force is increased and when the maximum traction force is reduced. Here, the time T1 and the time T2 are not limited to being the same value and may be values which differ from each other. In particular, the time in a case where the maximum traction force is increased may be set to a value which is larger than the time T2 in a case where the maximum traction force is reduced. In this case, it is possible to secure sufficient traction force during lifting work while suppressing slipping.

Here, in step S107 shown in FIG. 9, in a case where the change flag is not off, the control level of the traction force is maintained at the high level and the determination of step S103 to step S107 is repeated. Then, when any of the conditions of step S103 and step S104 are no longer satisfied, the control level of the traction force is returned from the high level to the standard level in step S106.

Figure 12:
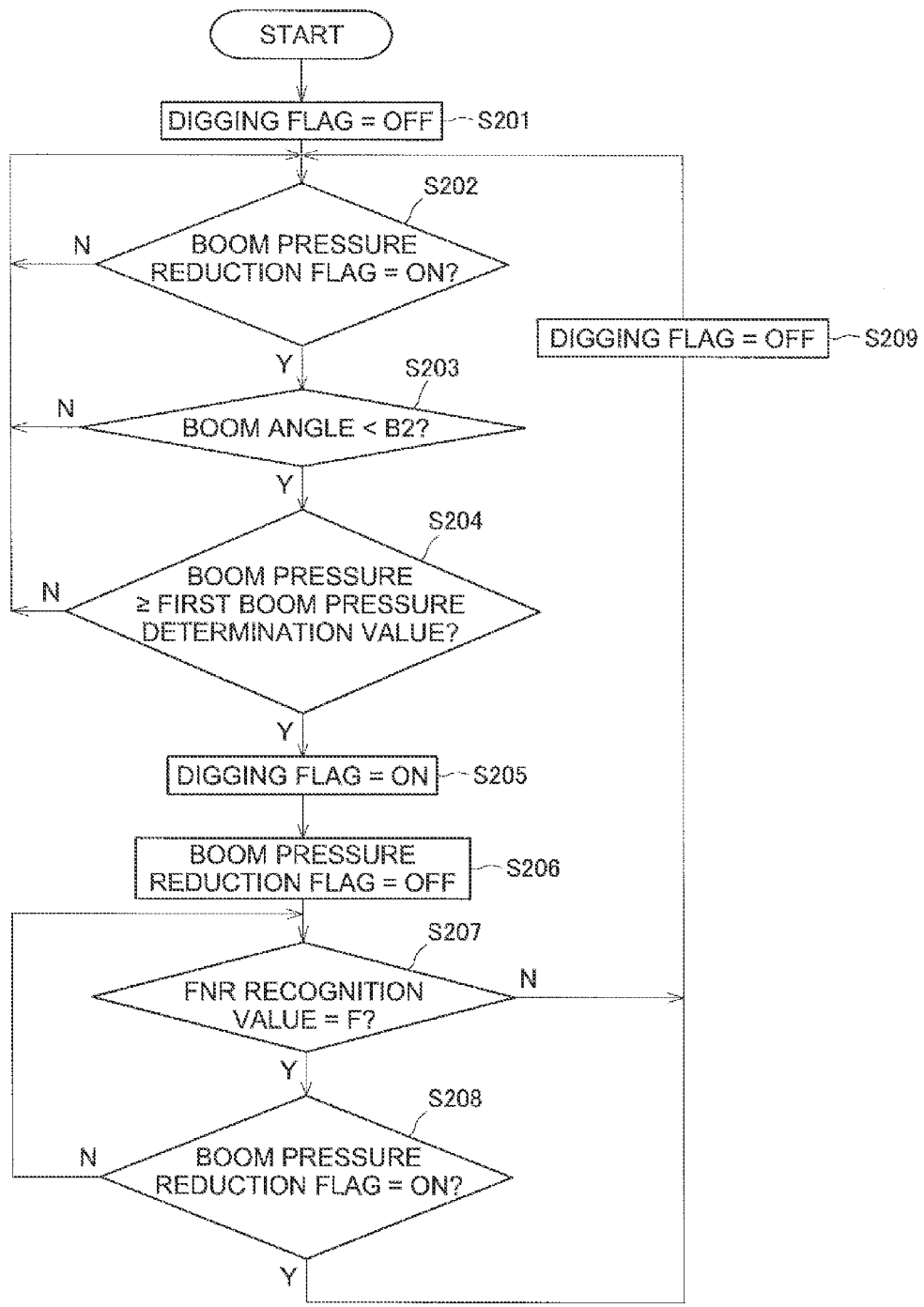
FIG. 12 is a flowchart illustrating a process for determining whether or not a work situation is digging.

FIG. 12 is a flowchart illustrating a process for determining whether or not the digging flag is on. That is, FIG. 12 is a flowchart illustrating a process for determining whether or not the work situation is digging. As shown in FIG. 12, in step S201, the work situation determination section 62 sets the digging flag to off. In step S202, the work situation determination section 62 determines whether or not a boom pressure reduction flag is on. The boom pressure reduction flag being on has the meaning that the bucket is in an empty state. The process for determining the boom pressure reduction flag will be described later.

In step S203, it is determined whether or not the boom angle is smaller than the predetermined angle threshold B2. The angle threshold B2 is equivalent to a boom angle when the bucket is placed on the ground. The angle threshold B2 is smaller than the angle threshold B1 described above.

In step S204, the work situation determination section 62 determines whether or not the boom pressure is a first boom pressure determination value or more. The boom pressure is the fluid pressure which is supplied to the lift cylinder 19 when the lift cylinder 19 is extended. The boom pressure is detected by the boom pressure sensor 22 described above. The first boom pressure determination value is a value of the boom pressure which is possible during digging. The first boom pressure determination value is set by being determined by experiments or simulation in advance. The first boom pressure determination value is a value according to the boom angle. The vehicle body controller 12 stores boom pressure determination value information which indicates the relationship between the first boom pressure determination value and the boom angle (referred to below as "first boom pressure determination value information"). The first boom pressure determination value information is, for example, a table or a map which indicates the relationship between the first boom pressure determination value and the boom angle. The work situation determination section 62 determines the first boom pressure determination value according to the boom angle by referencing the first boom pressure determination value information.

When all of the conditions in step S202 to step S204 are satisfied, the process proceeds to step S205. In step S205, the work situation determination section 62 sets the digging flag to on. That is, the work situation determination section 62 determines that the work situation is digging when all of the conditions in step S202 to step S204 are satisfied. This is because it is possible to interpret that the wheel loader 50 has entered a digging preparation stage when all of the conditions in step S202 to step S204 are satisfied. When at least one of the conditions of steps S202, S203, and S204 is not satisfied, the determination of step S202 to step S204 is repeated.

In addition, in step S206, the work situation determination section 62 sets the boom pressure reduction flag to off. Next, in step S207, the work situation determination section 62 determines whether or not an FNR recognition value is F. The FNR recognition value is information which indicates whether the vehicle is any of a forward state, a reverse state, or a neutral state. The FNR recognition value being F has the meaning that the vehicle is in the forward state. The FNR recognition value being R has the meaning that the vehicle is in the reverse state. The FNR recognition value being N has the meaning that the vehicle is in the neutral state. The work situation determination section 62 determines whether or not the FNR recognition value is F based on the detection signal from the forward and reverse switching operation section 14. When the FNR recognition value is not F, the process proceeds to step S209. In step S209, the work situation determination section 62 sets the digging flag to off. That is, when the vehicle is in the reverse state or the neutral state, the digging flag is set to off. When the FNR recognition value is F in step S207, the process proceeds to step S208.

In step S208, the work situation determination section 62 determines whether or not the boom pressure reduction flag is on. When the boom pressure reduction flag is on, the process proceeds to step S209. When the boom pressure reduction flag is not on, the process returns to step S207. Accordingly, when it is determined once that the work situation is digging, after this, the digging flag is maintained as on even if the conditions of step S202 to step S204 are no longer satisfied until the forward and reverse switching operation section 14 is switched from the forward position to the reverse position or until the forward and reverse switching operation section 14 is switched from the forward position to the neutral position. Here, the digging flag is changed to off when the boom pressure reduction flag is set to on even if the forward and reverse switching operation section 14 is maintained in the forward position.

Figure 13:
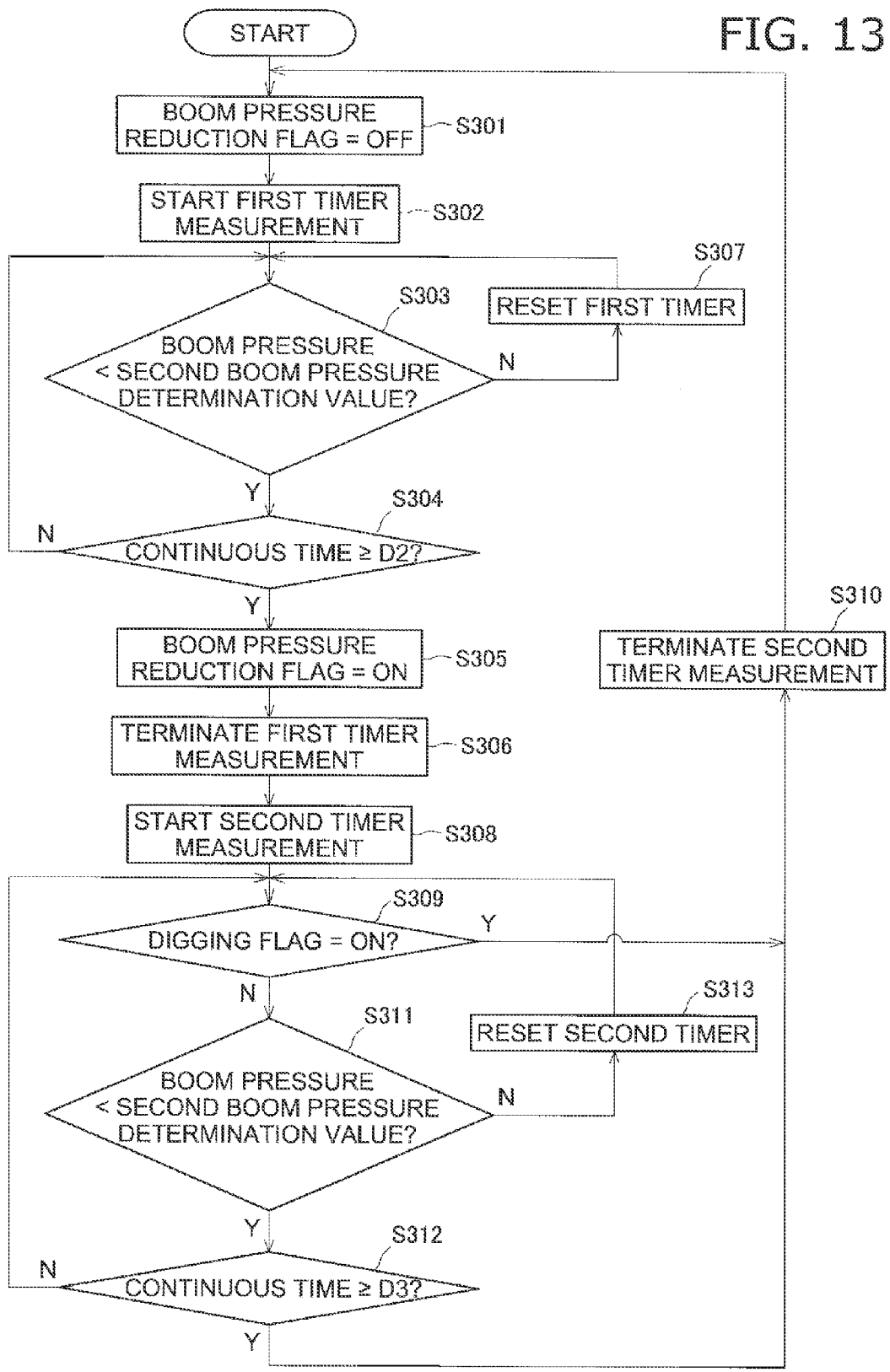
Figure 14:
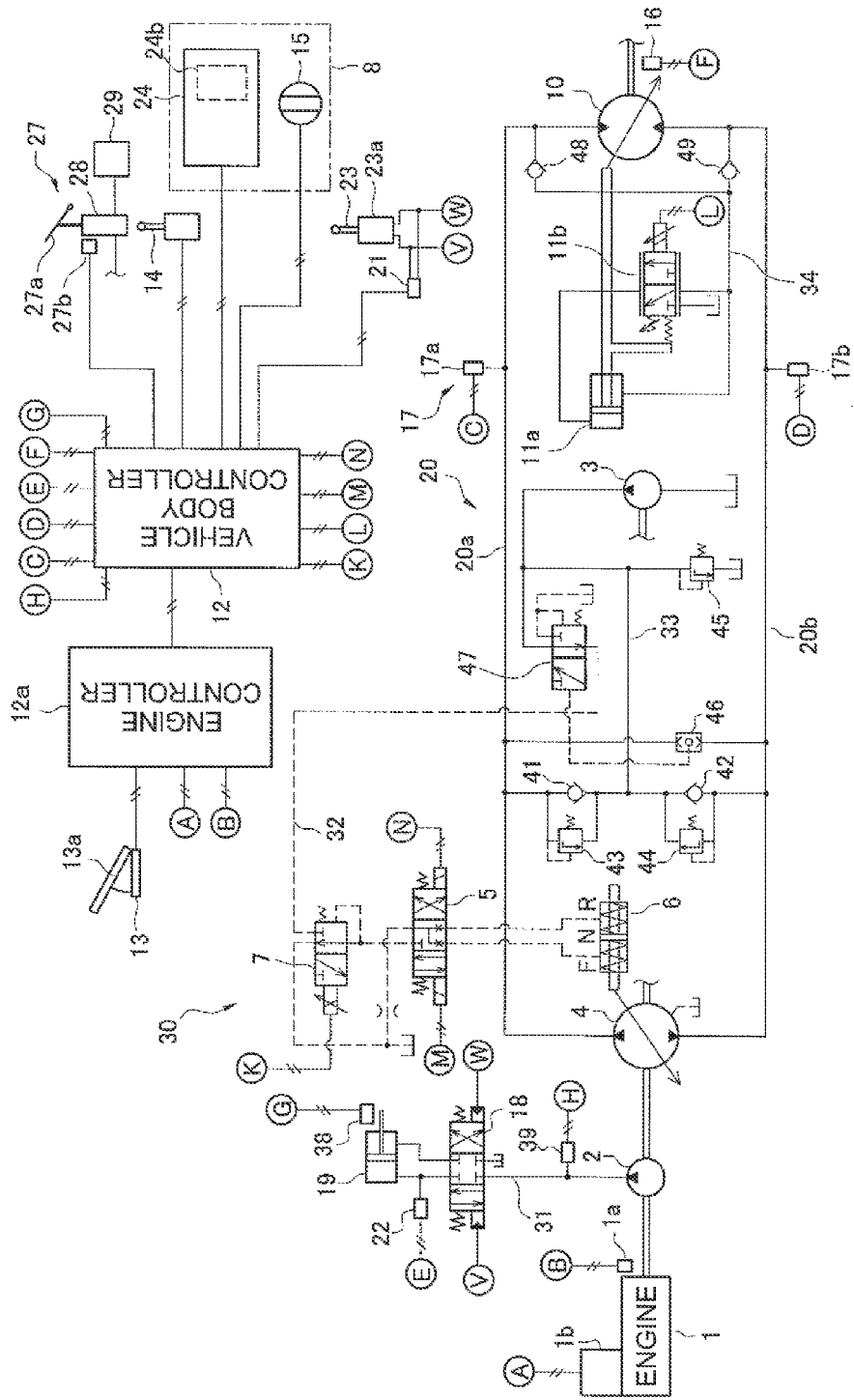
FIG. 14 is a block diagram illustrating a configuration of a hydraulic driving mechanism which is mounted in a wheel loader according to another embodiment.

FIG. 13 is a flowchart illustrating a process for determining whether or not the boom pressure reduction flag is on. As shown in FIG. 13, in step S301, the work situation determination section 62 sets the boom pressure reduction flag to off.

In step S302, the work situation determination section 62 starts measuring with a first timer. Here, the first timer measures a continuous time where the conditions for setting the boom pressure reduction flag to on are satisfied.

In step S303, the work situation determination section 62 determines whether or not the boom pressure is smaller than a second boom pressure determination value. The second boom pressure determination value is a value of the boom pressure which is possible when the bucket is in an empty state. The vehicle body controller 12 stores boom pressure determination value information which indicates the relationship between the second boom pressure determination value and the boom angle (referred to below as "second boom pressure determination value information"). The second boom pressure determination value information is, for example, a table or a map which indicates the relationship between the second boom pressure determination value and the boom angle. The work situation determination section 62 determines the second boom pressure determination value according to the boom angle by referencing the second boom pressure determination value information. In the second boom pressure determination value information, when the boom angle is larger than zero degrees, the second boom pressure determination value is constant at a value when the boom angle is zero degrees. This is because the rate of increase of the boom pressure when the boom angle is zero degrees or more is smaller than the rate of increase of the boom pressure when the boom angle is smaller than zero degrees and it is possible to approximate the second boom pressure determination value when the boom angle is larger than zero degrees using the second boom pressure determination value when the boom angle is zero degrees.

In step S304, the work situation determination section 62 determines whether or not the measurement time by the first timer is a predetermined time threshold D2 or more. That is, a continuous time determination section 67 determines whether or not the continuous time in a state where the condition of step S303 has been satisfied is the predetermined time threshold D2 or more. The time threshold D2 is set to a time to the extent that it is possible to interpret that the condition of step S303 is temporarily not satisfied. The time threshold D2 is larger than a time threshold D1. When the measurement time by the first timer is not the predetermined time threshold D2 or more, the determination of step S303 is repeated. When the measurement time by the first timer is the predetermined time threshold D2 or more in step S304, the process proceeds to step S305.

In step S305, the work situation determination section 62 sets the boom pressure reduction flag to on. Then, in step S306, the work situation determination section 62 terminates the measuring with the first timer. Here, when the boom pressure is not smaller than the second boom pressure determination value in step S303, the process proceeds to step S307. In step S307, the work situation determination section 62 resets the first timer.

In step S308, the work situation determination section 62 starts measuring with a second timer. Then, in step S309, the work situation determination section 62 determines whether or not the digging flag is on. When the digging flag is on, the process proceeds to step S310.

In step S310, the work situation determination section 62 terminates the measuring with the second timer. Then, the process returns to step S301 and the work situation determination section 62 sets the boom pressure reduction flag to off.

When the digging flag is not on in step S309, the process proceeds to step S311. In step S311, the work situation determination section 62 determines whether or not the boom pressure is smaller than the second boom pressure determination value. When the boom pressure is smaller than the second boom pressure determination value, the process proceeds to step S312.

In step S312, the work situation determination section 62 determines whether or not the measurement time by the second timer is a predetermined time threshold D3 or more. When the measurement time by the second timer is the predetermined time threshold D3 or more, the process proceeds to step S310. In the same manner as described above, the work situation determination section 62 terminates the measuring with the second timer in step S310 and sets the boom pressure reduction flag to off in step S301. When the measurement time by the second timer is not the predetermined time threshold D3 or more in step S312, the process proceeds to step S309.

Here, when the boom pressure is not smaller than the second boom pressure determination value in step S311, the process proceeds to step S313. In step S313, the work situation determination section 62 resets the second timer and the process returns to step S309.

In the wheel loader 50 according to the embodiment, the control level of the traction force is raised from the standard level to the high level when the determination conditions described above are satisfied in the traction force control. Due to this, the maximum traction force is increased. The determination conditions include that the work situation is digging, that the operation amount of the acceleration operation member is the predetermined operation threshold or more, and that the boom angle is the predetermined angle threshold or more. As a result, that the determination conditions are satisfied has the meaning that the wheel loader is performing lifting work. In the wheel loader according to the embodiment, it is possible to obtain sufficient traction force during lifting work by the maximum traction force being automatically increased in such a state. In addition, it is possible to suppress a reduction in operability since it is not necessary for the operator to perform an operation for increasing the maximum traction force.

When the determination conditions are satisfied, the traction force control section 61 raises the control level of the traction force from the standard level to the high level, but the maximum traction force at the high level is smaller than the maximum traction three with the traction force control in the off state. Accordingly, when the determination conditions are satisfied, it is possible to prevent excessive increasing of the maximum traction force.

It is possible for the operator to change the size of the maximum traction force at the standard level by operating the traction force level changing section 24a. Then, when the determination condition are satisfied, the traction force control section 61 increases the maximum traction force to a value which is larger than the maximum traction force at the standard level. Due to this, it is possible for the operator to more precisely set the necessary maximum traction force according to the circumstance at the work.

The standard level is changed b the traction force level changing section 24a to a level which is shown in the vehicle speed and traction force characteristics Lup in FIG. 6 when the determination conditions are satisfied even when set to any of the levels shown in the vehicle speed and traction force characteristics La to Lc in FIG. 6. Due to this, it is possible for the wheel loader to obtain sufficient traction force during lifting work. In addition, as shown in FIG. 6, the change in the traction force is smaller with regard to the change in the vehicle speed in the vehicle speed and traction force characteristics Lup compared to the vehicle speed and traction force characteristics Lmax with the traction force control in the off state. Specifically, in FIG. 6 in a case where the vehicle speed changes from a second vehicle speed V2 to zero, the change in the traction force in the vehicle speed and traction force characteristics Lup is smaller than the change in the traction force in the vehicle speed and traction force characteristics Lmax. As a result, it is possible to suppress a reduction in operability since rapid changes in the traction force is suppressed.

When the determination conditions are no longer satisfied in the traction force control, the traction force control section 61 returns the control level of the traction force to the standard level. Specifically, when the work situation is no longer digging in the traction force control, the traction force control section 61 returns the control level of the traction force to the standard level. In addition, when the boom angle is smaller than the predetermined angle threshold B1 in the traction force control, the traction force control section 61 returns the control level of the traction force control to the standard level. Due to this, it is possible to obtain the maximum traction force which is appropriate according to the circumstance at the work. Furthermore, it is possible to suppress a reduction in operability since it is possible to suppress frequent increases and decreases in the traction force according to changes in the acceleration operation amount by maintaining the control level of the traction force at the current level when the acceleration operation amount is smaller than the predetermined acceleration amount A1 in the traction force control.

Above, an embodiment of the present invention has been described but the present invention is not limited to the embodiment described above and various modifications are possible in the range which does not depart from the scope of the invention.

In the embodiment described above, the wheel loader 50, where an HST system with one pump and one motor including one hydraulic pump and movement hydraulic motor 10 is mounted, is described as an example. However, the present invention is not limited to this. For example, the present invention may be applied with regard to a wheel loader where an HST system with one pump and two motors including one hydraulic pump and two movement hydraulic motor is mounted.

In the embodiment described above, it is possible for the traction force level changing section 24a to change the size of the maximum traction force at the standard level in three stages. However, the traction force level changing section 24a may be able to change the size of the maximum traction force at the standard level in a plurality of stages other than three stages. Alternatively, the traction force level changing section 24a may be able to change the size of the maximum traction force at the standard level to an arbitrary size in a continuous manner. Alternatively, the traction force level changing section 24a may be omitted. That is, the size of the maximum traction force at the standard level may not be able to be changed.

The determination conditions are not limited to the conditions described above and other conditions may be added. Alternatively, a part of the determination condition described above may be changed.

In the embodiment described above, the traction force control section 61 reduces the maximum traction force by changing the upper limit displacement of the motor displacement, but the maximum traction force may be reduced using another method. For example, the traction force control section 61 may reduce the maximum traction force by controlling the drive circuit pressure. The drive circuit pressure is controlled by, for example, the displacement of the first hydraulic pump 4 being controlled.

In the embodiment described above, the traction force ratio information is set so that the traction force ratio increases according to an increase in the acceleration operation amount, but the traction force ratio information may be set so that the traction force ratio is constant irrespective of the acceleration operation amount.

In the embodiment described above, the control level of the traction force is set to a level which is set in advance by the traction force control operation member 15 being operated, but the traction force control operation section 8 may be configured so that it is possible for the operator to directly select the control level of the traction force from a plurality of levels and instruct the execution thereof. In this case, for example, the traction force control operation section 8 has a traction force control selection section 24b as shown in FIG.

Figure 15:
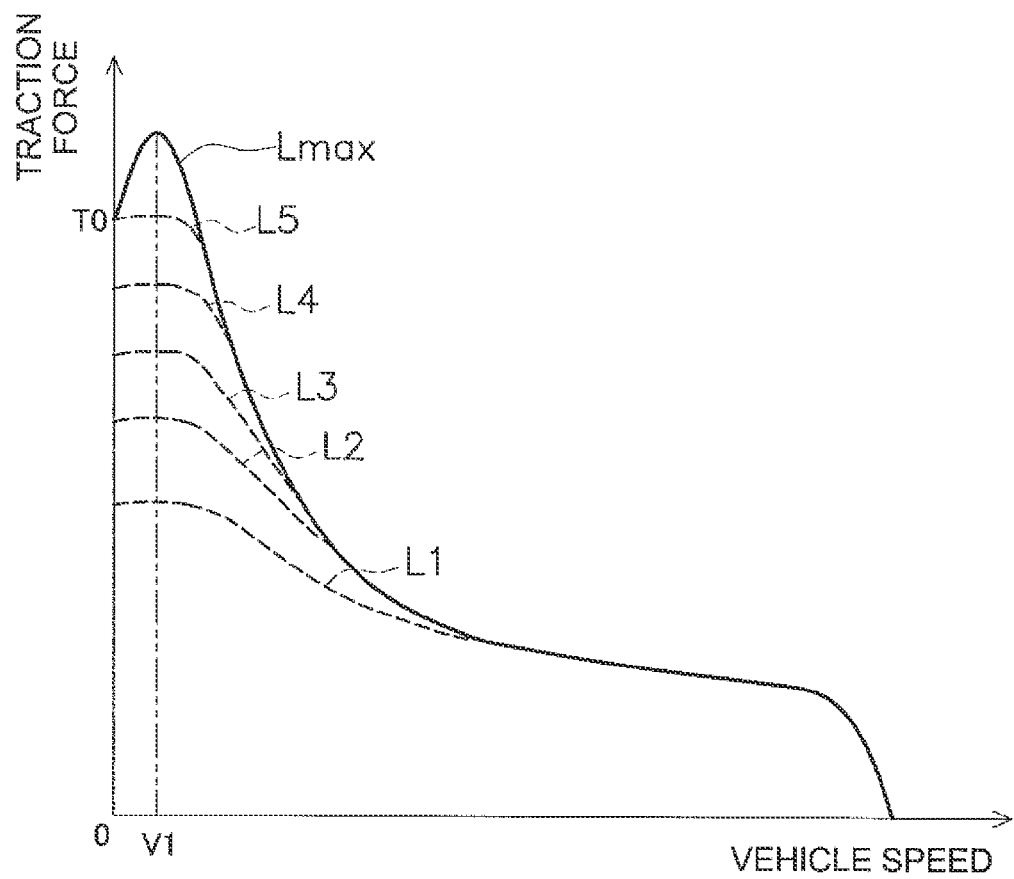
FIG. 15 is a diagram illustrating an example of the vehicle speed and a traction force line diagram of a wheel loader.

14. The traction force control selection section 24*b* is operated so as to instruct the selection of the control level of the traction force and the execution of the traction force control. Using the traction force control selection section 24*h*, the operator selects the control level of the traction force from a plurality of levels and instructs the execution of the traction force control. FIG. 15 shows vehicle speed and traction force characteristics L1 to L5 at each control level of the traction force which is able to be selected using the traction force control selection section 24*b*. As shown by FIG. 15, it is possible for the traction force control selection section 24*b* to instruct the execution of the traction force control at a control level with five stages from a first level to a fifth level. L1 indicates the vehicle speed and traction force characteristics at the first level. L2 indicates the vehicle speed and traction force characteristics at the second level. L3 indicates the vehicle speed and traction force characteristics at the third level. L4 indicates the vehicle speed and traction force characteristics at the fourth level. L5 indicates the vehicle speed and traction force characteristics at the fifth level. The maximum traction force at the first level is the smallest and the maximum traction force at the fifth level is the largest. In addition, the vehicle speed and traction force characteristics at the fifth level match the vehicle speed and traction force characteristics at the high level described above (refer to Lup in FIG. 6). The traction force control section 61 increases the maximum traction force when the determination conditions are satisfied in the traction force control in the same manner as the embodiments described above. For example, the traction force control section 61 increases the maximum traction force to a level which is one higher than the level which has been selected by the traction force control selection section 24*b* when the determination conditions are satisfied in the traction force control. Specifically, the traction force control section 61 raises the control level to the second level when the determination conditions are satisfied in the traction force control at the first level. The traction force control section 61 raises the control level to the third level when the determination conditions are satisfied in the traction force control at the second level. The traction force control section 61 raises the control level to the fourth level when the determination conditions are satisfied in the traction force control at the third level. The traction force control section 61 raises the control level to the fifth level when the determination conditions are satisfied in the traction force control at the fourth level. However, the traction force control section 61 maintains the control level at the fifth level when the determination conditions are satisfied in the traction force control at the fifth level. In addition, the traction force control section 61 returns the control level of the traction force to the original level when the determination conditions are no longer satisfied in the traction force control.

In the configuration described above, it is possible for the control level of the traction force to be immediately executed by being selected from a plurality of levels by the traction force control selection section 24*b* being operated. In addition, it is possible for the wheel loader to obtain sufficient traction force during lifting work since the maximum traction force is increased more than the level which is selected by the operator when the determination conditions are satisfied. Furthermore, since the maximum traction force which has been increased is a level which is able to be selected by the operator, there is less of a sense of unease with regard to operation for the operator. Due to this, it is possible to suppress a reduction in operability.

Here, the number of levels which are able to be selected using the traction force control selection section 24*b* is not limited to five. It may be possible to selection levels which are less than five or which are more than five using the traction force control selection section 24*b*. Alternatively, it may be possible to select the maximum traction force with an arbitrary size in a continuous manner using the traction force control selection section 24*b*. In addition, the control level of the traction force may be raised to a level which is two higher without being limited to a level which is one higher than the current level when the determination conditions are satisfied. Alternatively, the control level of the traction force may be raised to a level other than a level which is able to be selected using the traction force control section 24*b*. Furthermore, the traction force control operation section 8 may have the traction force control selection section 24*b* along with the traction force control operation member 15 and the traction force level changing section 24*a*. That is, the traction force control operation section 8 may be configured so that the traction force control using the traction force control operation member 15 and the traction force level changing section 24*a* and the traction force control using the traction force control operation section 24*b* are selectively executed.

According to the illustrated embodiment, it is possible to provide a wheel loader and a wheel loader control method where it is possible to obtain sufficient traction force during lifting work and it is possible to suppress a reduction in operability.

The invention claimed is:

1. A wheel loader comprising:
   a working implement having a boom and a bucket;
   an engine;
   a hydraulic pump driven by the engine;
   a movement hydraulic motor driven by hydraulic fluid discharged from the hydraulic pump;
   an acceleration operation member operated in order to set a target rotation speed for the engine;
   a traction force control operation section operated in order to switch between an on state and an off state of a traction force control for reducing maximum traction force;
   a work situation determination section configured to determine whether or not a work situation is digging;
   an acceleration operation amount determination section configured to determine whether or not an operation amount of the acceleration operation member is a predetermined operation threshold or more;
   a boom angle determination section configured to determine whether or not a boom angle, which is an angle with regard to a horizontal direction of the boom, is a predetermined angle threshold or more; and
   a traction force control section configured to reduce the maximum traction force to below the maximum traction force with the traction force control in the off state when the traction force control is in the on state,
   wherein the traction force control section is configured to increase the maximum traction force when determination conditions including that the work situation is digging, that the operation amount of the acceleration operation member is the predetermined operation threshold or more, and that the boom angle is the predetermined angle threshold or more, are satisfied with the traction force control in the on state.

2. The wheel loader according to claim 1, wherein
   the traction force control section is configured to set a control level of traction force in the traction force control to a standard level, the maximum traction force at the standard level being smaller than the maximum traction force with the traction force control in the off state, the traction force control section is configured to change the control level of the maximum traction force to a high level when the determination conditions are satisfied with the traction force control in the on state, and the maximum traction force at the high level being higher than the maximum traction force at the standard level.

3. The wheel loader according to claim 2, wherein the maximum traction force at the high level is smaller than the maximum traction force with the traction force control in the off state.

4. The wheel loader according to claim 2, wherein the traction force control section has a traction force level changing section configured to change a size of the maximum traction force at the standard level and a traction force control operation member configured to instruct execution of the traction force control at the standard level.

5. The wheel loader according to claim 4, wherein the maximum traction force at the high level is constant irrespective of the size of the maximum traction force at the standard level which is changed by the traction force level changing section.

6. The wheel loader according to claim 5, wherein the traction force is the maximum traction force when a vehicle speed of the wheel loader is a first vehicle speed which is higher than zero in a case where the traction force control is in the off state, and the traction force at the high level when the vehicle speed is zero matches with the traction force with the traction force control in the off state when the vehicle speed is zero.

7. The wheel loader according to claim 2, wherein the traction force control section is configured to return the control level of the traction force to the standard level when the determination conditions are no longer satisfied with the traction force control in the on state.

8. The wheel loader according to claim 1, wherein the traction force control operation section has a traction force control selection section configured to select the control level of the traction force from a plurality of levels and to instruct execution of the traction force control, and the traction force control section is configured to increase the maximum traction force more than a level which is selected by the traction force control selection section when the determination conditions are satisfied with the traction force control in the on state.

9. The wheel loader according to claim 8, wherein the traction force control section is configured to increase the maximum traction force to one level higher than the level which is selected by the traction force control selection section when the determination conditions are satisfied with the traction force control in the on state.

10. The wheel loader according to claim 8, wherein the traction force control section is configured to return the control level of the traction force to an original level when the determination conditions are no longer satisfied with the traction force control in the on state.

11. The wheel loader according to claim 1, wherein the traction force control section is configured not to perform the increasing of the maximum traction force when the work situation is not digging.

12. The wheel loader according to claim 1, wherein the traction force control section is configured not to perform the increasing of the maximum traction force when the operation amount of the acceleration operation member is not the predetermined operation threshold or more.

13. The wheel loader according to claim 1, wherein the traction force control section is configured not to perform the increasing of the maximum traction force when the boom angle is not the predetermined angle threshold or more.

14. The wheel loader according to claim 1, wherein the work situation determination section is configured to determine whether or not the work situation is digging based on a movement state of the wheel loader and an action state of the working implement.

15. The wheel loader according to claim 1, wherein the traction force control section is configured to control a displacement of the movement hydraulic motor by controlling an inclination angle of the movement hydraulic motor and to perform control of the maximum traction force by controlling an upper limit displacement of the displacement of the movement hydraulic motor.

16. The wheel loader according to claim 1, wherein a ratio of the maximum traction force with regard to the maximum traction force with the traction force control in the off state is set as a traction force ratio, and the traction force control section is configured to set the traction force ratio according to the operation amount of the acceleration operation member or the engine rotation speed with the traction force control in the on state.

17. The wheel loader according to claim 16, wherein the traction force control section is configured to increase the traction force ratio by a predetermined proportion when the determination conditions are satisfied with the traction force control in the on state.

18. A control method of a wheel loader which including a working implement having a boom and a bucket, an engine, a hydraulic pump driven by the engine, a movement hydraulic motor driven by hydraulic fluid discharged from the hydraulic pump, an acceleration operation member operated in order to set a target rotation speed for the engine, and a traction force control operation section operated in order to switch between an on state and an off state of the traction force control for reducing maximum traction force, the method comprising:

determining whether or not a work situation is digging;

determining whether or not a boom angle, which is an angle with regard to a horizontal direction of the boom, is a predetermined angle threshold or more;

determining whether or not an operation amount of the acceleration operation member is a predetermined operation threshold or more;

reducing the maximum traction force to below the maximum traction force with the traction force control in the off state when the traction force control is in the on state; and increasing the maximum traction force when determination conditions including that the work situation is digging, that the operation amount of the acceleration operation member is the predetermined operation threshold or more, and that the boom angle is the predetermined angle threshold or more are satisfied with the traction force control in the on state.

* * * * *